(12) United States Patent
Tian

(10) Patent No.: US 10,222,764 B2
(45) Date of Patent: Mar. 5, 2019

(54) APPLICATION-SPECIFICATION-ORIENTED CONTROL DESIGN

(71) Applicant: LINESTREAM TECHNOLOGIES, Cleveland, OH (US)

(72) Inventor: Gang Tian, Westlake, OH (US)

(73) Assignee: LINESTREAM TECHNOLOGIES, Cleveland, OH (US)

(*) Notice: Subject to any disclaimer, the term of this patent is extended or adjusted under 35 U.S.C. 154(b) by 111 days.

(21) Appl. No.: 15/294,996

(22) Filed: Oct. 17, 2016

(65) Prior Publication Data

US 2018/0107173 A1    Apr. 19, 2018

(51) Int. Cl.
  *G05B 13/02* (2006.01)
  *G05B 19/402* (2006.01)

(52) U.S. Cl.
  CPC ......... *G05B 13/024* (2013.01); *G05B 19/402* (2013.01); *G05B 2219/34208* (2013.01); *G05B 2219/39264* (2013.01)

(58) Field of Classification Search
  CPC .............. G05B 13/024; G05B 19/402; G05B 2219/34208; G05B 2219/39264
  See application file for complete search history.

(56) References Cited

U.S. PATENT DOCUMENTS

| | | | |
|---|---|---|---|
| 5,929,400 A * | 7/1999 | Colby | H02P 21/16 187/290 |
| 8,041,436 B2 | 10/2011 | Gao | |
| 8,060,340 B2 | 11/2011 | Gao et al. | |
| 8,467,888 B2 | 6/2013 | Gahinet et al. | |
| 8,710,777 B2 | 4/2014 | Tian | |
| 9,041,337 B2 | 5/2015 | Tian | |
| 2003/0199997 A1 | 10/2003 | Gao | |
| 2004/0059518 A1 | 3/2004 | Rothschild | |

(Continued)

OTHER PUBLICATIONS

The MathWorks, Inc., Curve Fitting Toolbox User's Guide, R2016b, 2001-2016.

*Primary Examiner* — Yuhui R Pan
(74) *Attorney, Agent, or Firm* — Amin, Turocy & Watson LLP

(57) ABSTRACT

A motion control design system implements a performance specification-oriented design approach. The system allows a designer to define desired performance specifications that are to be satisfied by a motion system, and determines tuning parameters (e.g., controller bandwidth and associated tuning parameters) that will yield performance within the defined performance specifications. An identification process identifies system parameters of interest based on collected system data. After the user has entered the desired performance specifications, an optimization process determines a range of bandwidths that will satisfy all specified performance requirements, and selects an optimal bandwidth within this range. A tuning process generates the corresponding tuning parameters for a systematically designed motion controller. Rather than using an optimal solver, the design system stores relationships between performance specifications and the major tuning parameter as matrices or mapping functions, given system parameters as inputs, making the design system suitable for embedded systems.

20 Claims, 19 Drawing Sheets

(56) References Cited

U.S. PATENT DOCUMENTS

| | | | |
|---|---|---|---|
| 2009/0319136 A1* | 12/2009 | Anderson | E02F 9/2246 |
| | | | 701/54 |
| 2014/0379102 A1* | 12/2014 | Tian | G05B 11/01 |
| | | | 700/52 |
| 2016/0033944 A1 | 2/2016 | El-Shaer et al. | |
| 2016/0094628 A1 | 3/2016 | Husain et al. | |
| 2016/0209816 A1 | 7/2016 | Neundorfer | |
| 2016/0276966 A1 | 9/2016 | Tian | |

* cited by examiner

APPLICATION-SPECIFICATION-ORIENTED CONTROL DESIGN

TECHNICAL FIELD

This disclosure generally relates to motion control, and, more specifically, to analysis and design of motion control systems.

BACKGROUND

Many automation applications employ motion control systems to control machine position and speed. Such motion control systems typically include one or more motors or similar actuating devices operating under the guidance of a controller, which sends position and speed control instructions to the motor in accordance with a user-defined control algorithm. Some motion control systems operate in a closed-loop configuration, whereby the controller instructs the motor to move to a target position or to transition to a target velocity (a desired state) and receives feedback information indicating an actual state of the motor. The controller monitors the feedback information to determine whether the motor has reached the target position or velocity, and adjusts the control signal to correct errors between the actual state and the desired state.

Designers of motion control systems seek to achieve an optimal trade-off between various performance aspects. For example, an aggressively tuned controller may result in a system that tracks a reference position signal with high accuracy and fast response time, but experiences instabilities in the presence of system noise and or other disturbances. Alternatively, tuning the controller more conservatively will improve system stability, but at the expense of response time. The process of selecting suitable gain coefficients for the controller is known as tuning.

Turning the gain coefficients for a given controller determines the controller's bandwidth, which is a measure of responsiveness of the controlled mechanical system to changes in the control signal. The response of the controlled system to a signal from a controller is partially a function of the controller's bandwidth and the physical characteristics of the mechanical system or plant (e.g., inertia, damping, friction, coupling stiffness, resonance, etc.).

In many motion control applications, system designers attempt to tune the motion controller to optimize, to the degree possible, one or more selected performance variables or specifications that are considered particularly important, depending on the type of application being performed by the motion system. For example, in some motion control applications, maintaining a low maximum deviation may be a higher priority than maintaining a low torque noise level. In such applications, the system designer may attempt to tune the controller to minimize the maximum deviation of the system, while accepting that there may be a commensurate increase in the torque noise level (which typically increases as the maximum deviation is decreased).

The process of tuning a controller to satisfy the specifications of a particular motion control application is a challenging task. Although the dynamics of system and controller tuning are well studied, the act of tuning a control system in order to meet application specifications, taking the limits of the motion system into consideration, is still not an automated process in practice.

The above-described is merely intended to provide an overview of some of the challenges facing conventional motion control systems. Other challenges with conventional systems and contrasting benefits of the various non-limiting embodiments described herein may become further apparent upon review of the following description.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its purpose is to present some concepts of one or more embodiments in a simplified form as a prelude to the more detailed description that is presented later.

One or more embodiments of the present disclosure relate to motion control design systems that implement an application specification oriented motion control design technique, including identification, optimization, and automatic tuning. In one or more embodiments, the design system described herein can identify system parameters of interest for a motion system, and determine a bandwidth operation range, and an optimal bandwidth within that range, that satisfies all user-defined application performance specifications as well as the inner loop limit. The system can then generate the corresponding parameters based on the optimal bandwidth for a systematically designed controller (e.g., an active disturbance rejection control, or ADRC, controller).

The identification, optimization, and tuning techniques implemented by embodiments of the design system described herein can eliminate the need to select motion control tuning parameters using laborious trial-and-error approaches, while still achieving a tuning that satisfies user-specified application specifications (e.g., maximum disturbance deviation, settling time, control signal noise level, system variable variation tolerance range, gain margin, phase margin etc.). The design techniques are also suitable for implementation on embedded control systems, since the system does not require optimization algorithms to be executed.

The following description and the annexed drawings set forth herein detail certain illustrative aspects of the one or more embodiments. These aspects are indicative, however, of but a few of the various ways in which the principles of various embodiments can be employed, and the described embodiments are intended to include all such aspects and their equivalents.

DETAILED DESCRIPTION

Figure 1:
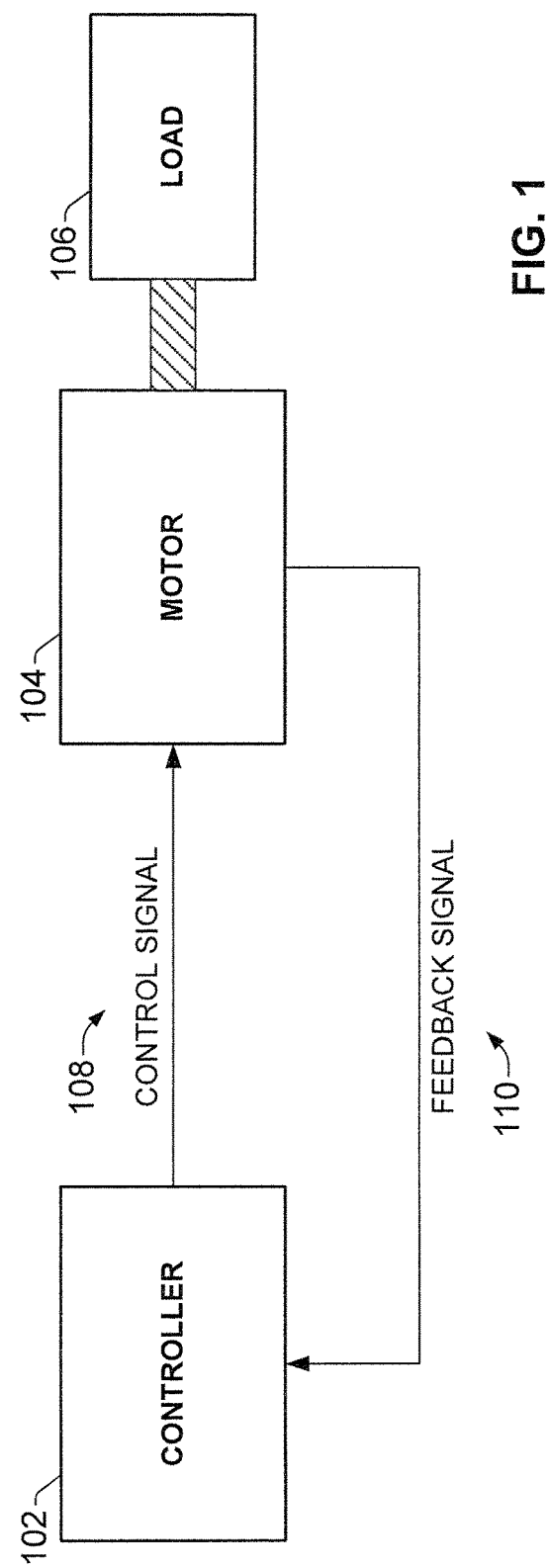
FIG. 1 is a simplified diagram of a closed-loop motion control architecture.

Various embodiments are now described with reference to the drawings, wherein like reference numerals refer to like elements throughout. In the following description, for the purposes of explanation, numerous specific details are set forth in order to provide an understanding of this disclosure. It is to be understood, however, that such embodiments may be practiced without these specific details, or with other methods, components, materials, etc. In other instances, structures and devices are shown in block diagram form to facilitate describing one or more embodiments.

Systems and methods described herein relate generally to the use of a systematic control design technique with respect to motion system parameters to facilitate generation of substantially optimized control tuning parameters. In one or more embodiments, a motion control design system implements a performance specification-oriented design approach. The system allows a designer to define desired performance specifications that are to be satisfied by the motion system, and determines tuning parameters (e.g., controller bandwidth and associated tuning parameters) that will yield performance within the defined performance specifications. An identification process identifies system parameters of interest based on collected system data. After the user has entered the desired performance specifications, an optimization process determines a range of bandwidths that will satisfy all specified performance requirements, and selects an optimal bandwidth within this range. Based on this optimal bandwidth, a tuning process generates the corresponding tuning parameters for a systematically designed motion controller. Rather than using an optimal solver, the design system stores relationships between performance specifications and the major tuning parameter as matrices or mapping functions, given system parameters as inputs, making the design system suitable for embedded systems By way of background, FIG. 1 is a simplified diagram of a closed-loop motion control architecture. Controller 102 is programmed to control motor 104, which drives mechanical load 106. In various example applications, motor 104 may be used to drive an industrial automation application or industrial tool, including but not limited to a machining or material handling robot, a conveyor, a tooling machine, a motorized hand tool, etc. Motor 104 may also be used in the traction and/or propulsion system of an electric vehicle design, including but not limited to an electric or hybrid electric automobile, a bicycles, a forklift or other industrial vehicle, a scooter, a railway vehicle such as a train, or other such vehicles. Motor 104 may also be used in building infrastructure and HVAC (heating, ventilating, and air conditioning) applications that require speed or motion control, such as fans and pumps. Motor 104 may also be used in a home or industrial appliance. For example, motor 104 may be used to drive the drum of a home or industrial washing machine, to control the spinning of a centrifuge, or to control the motion of other such appliances.

Controller 102, motor 104, and load 106 make up the primary components of an example motion control system, wherein linear and/or rotational motion of the load 106 is controlled by motor controller 102. In an example application, load 106 can represent an axis of a single- or multi-axis robot or positioning system. In such applications, controller 102 sends control signal 108 instructing the motor 104 to move the load 106 to a desired position at a desired speed. The control signal 108 can be provided directly to the motor 104, or to a motor drive (not shown) that controls the power delivered to the motor 104 (and consequently the speed and direction of the motor). Feedback signal 110 indicates a current state (e.g., position, velocity, etc.) of the motor 104 and/or load 106 in substantially real-time. In servo-driven systems, feedback signal 110 can be generated, for example, by an encoder or resolver (not shown) that tracks an absolute or relative position of the motor. In sensorless systems lacking a velocity sensor, the feedback signal can be provided by a speed/position estimator. During a move operation, the controller monitors feedback signal 110 to ensure that the load 106 has accurately reached the target position. The controller 102 compares the actual position of the load as indicated by the feedback signal 110 with the target position, and adjusts the control signal 108 as needed to reduce or eliminate error between the actual and target positions.

In another example application, load 106 can represent a spinning load (e.g., a pump, a washing machine, a centrifuge, etc.) driven by motor 104, in which controller 102 controls the rotational velocity of the load. In this example, controller 102 provides an instruction to motor 104 (via control signal 108) to transition from a first velocity to a second velocity, and makes necessary adjustments to the control signal 108 based on feedback signal 110. It is to be appreciated that the resonance estimation techniques of the present application are not limited to use with the example types of motion control systems described above, but rather are applicable for substantially any type of motion control application.

The control signal 108 generated by the controller 102 in response to an error between the desired position or velocity and the target position or velocity (as reported by the feedback signal 110) depends on the controller bandwidth, which is a function of the gain coefficients for the control loop. In general, higher bandwidths result in faster controller tracking and less sensitivity to external disturbances acting on the closed loop system, but may also result in higher instability or reduced accuracy (e.g., greater maximum deviations from a desired position or speed). The behavior of a motion system tuned for a given bandwidth is largely dependent on the mechanical characteristics of the controlled mechanical system. In this regard, there are a number of mechanical characteristics—e.g., inertia, Coulomb and viscous frictions, resonances, coupling stiffnesses, etc.—that affect how the system will perform under a given set of tuning parameters.

Depending on the type of application being carried out by the motion system, system designers may seek to tune the motion control system to substantially optimize a selected performance parameter or specification of interest. For example, for applications in which the ability of the system quickly respond to a change in requested speed or position is considered more important that accuracy, the system designer may attempt to set the controller's tuning parameters to achieve fast response, often at the expense of accuracy or stability. Other types of motion applications may require a greater level of accuracy (e.g., minimal overshoot relative to the requested speed or position), with less importance placed on the system response time. Accordingly, the system designer will seek to tune the system to optimize this performance parameter to the degree possible.

System designers typically use a trial-and-error approach to select suitable tuning parameters that result in an acceptable system performance that meets defined application specifications. For example, the designer may observe or measure performance of the motion system under a selected test set of tuning parameters, and adjust one or more parameters based on the observed or measured performance. This approach often requires several iterations and parameter adjustments to be performed before an acceptable performance is achieved, and also requires the designer to have a high level of understanding as to which parameters should be adjusted, and to what degree, based on the difference between observed performance and desired performance.

Some design systems seek to automate the process of tuning the motion control system using various techniques. For example, some systems allow a designer to enter certain parameters as inputs—e.g., the crossover bandwidth and/or phase margin—and finds a suitable set of controller gains (e.g., proportional-integral-derivative, or PID, gains) based on these inputs using an optimizer. Some of these systems also provide performance specifications as the output of the optimization.

However, such design systems still require the user to apply a trial-and-error approach in order to meet defined application specifications, such as maximum disturbance deviation, settling time, control signal noise level, system variable variation tolerance range, gain margin, phase margin, etc. That is, these design systems provide the measurable performance specifications as results, rather than accepting these performance specifications as input parameters to be satisfied. If the performance specification information generated by these design systems do not satisfy the design requirements, the designer must modify the input parameters unit the desired application specifications are satisfied.

Moreover, such design systems typically execute an optimization algorithm in order to determine the controller gains that satisfy the cross-over frequency and phase margin entered by the user. Such optimization algorithms may be suitable for use on simulation platforms, but are not practical for use in embedded systems.

Other design systems define cost functions and run certain optimization algorithms in order to find optimal control parameters for the motion system. However, these systems also require the use of an optimal solver, which renders these systems impractical for use in embedded systems.

To address these and other issues, one or more embodiments described herein provide an application specification-oriented control design system that applies a systematic control design approach with respect to system parameters. In general, the design system described herein implements three processes or stages for generating tuning parameters for a motion controller—identification, optimization, and automatic tuning. The identification stage identifies system parameters of interest for the motion system to be tuned. The optimization stage determines the bandwidth operation range and an optimal or otherwise suitable bandwidth within that range that satisfies the user-defined application performance specifications as well as the inner loop limit. The tuning stage generates the corresponding parameters for a systematically designed motion controller.

While example embodiments are described herein in connection with Active Disturbance Rejection Control (ADRC) controllers, the application specification-oriented control design approach can be applied to any type of controller with one or more tuning parameters, and is not limited to use with ADRC controllers. ADRC control systems incorporate an extended state observer in the control feedback loop to estimate internal and external disturbances on the plant. When the design techniques described herein are applied to ADRC systems, the ratio between the observer bandwidth and controller bandwidth, $R_{oc}$, can be used as an optional tuning parameter to adjust the system variation tolerance range.

According to one or more embodiments, the relationships between application specifications and the tuning parameter, as well as the relationships between the tuning parameter and ADRC parameters, are stored as mapping function matrix data, given other parameters as inputs. As such, no optimal solver or optimization algorithm is required to be executed, making the design system suitable for use in embedded systems.

The design system finds the operation range of the tuning parameter that satisfies the defined application specifications and stability considerations with respect to the inner loop and resonances. The system also recommends an optimal or otherwise suitable bandwidth, taking into consideration all the defined application specifications.

Figure 2:
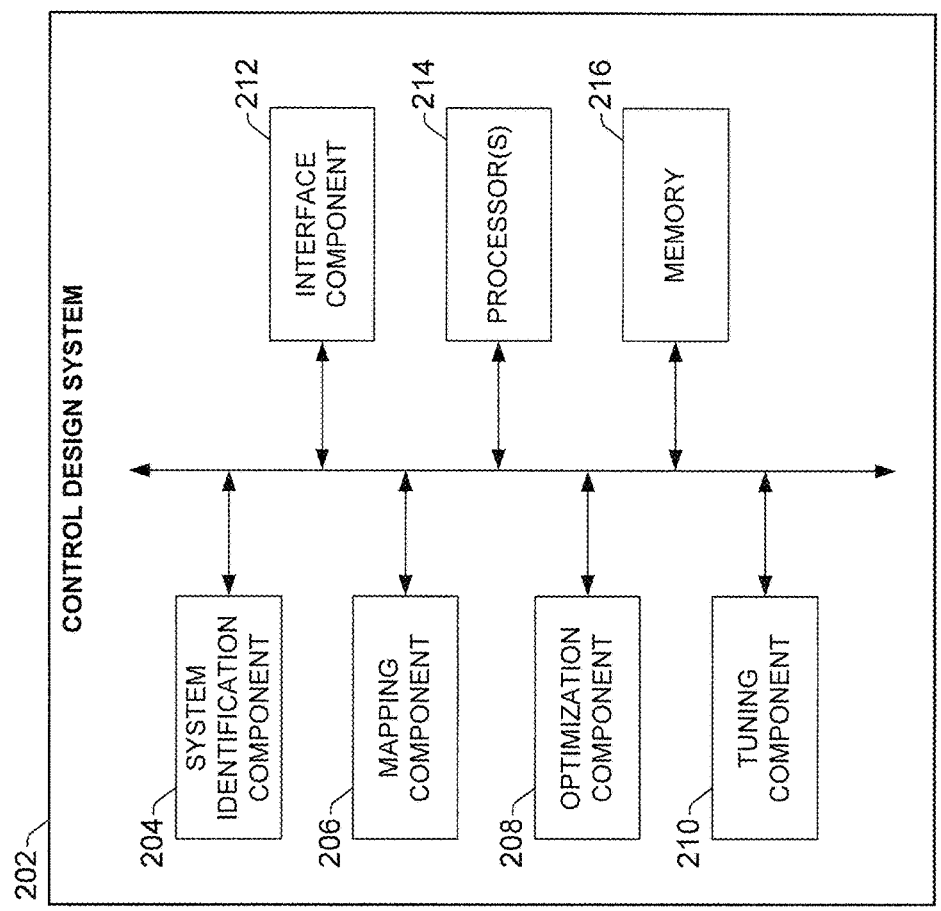
FIG. 2 is a block diagram of an example control design system capable of generating suitable tuning parameters for a motion control system that satisfy defined motion control application specifications.

FIG. 2 is a block diagram of an example control design system 202 capable of generating suitable tuning parameters (e.g., controller bandwidth or other tuning parameters) for a motion control system that satisfy defined motion control application specifications. Control design system 202 can include a system identification component 204, a mapping component 206, an optimization component 208, a tuning component 210, an interface component 212, one or more processors 214, and memory 216. In various embodiments, one or more of the system identification component 204, mapping component 206, optimization component 208, tuning component 210, interface component 212, the one or more processors 214, and memory 216 can be electrically and/or communicatively coupled to one another to perform one or more of the functions of the control design system 202. In some embodiments, components 204, 206, 208, 210, and 212 can comprise software instructions stored on memory 216 and executed by processor(s) 214. The control design system 202 may also interact with other hardware and/or software components not depicted in FIG. 2. For example, processor(s) 214 may interact with one or more external user interface device, such as a keyboard, a mouse, a display monitor, a touchscreen, or other such interface devices.

System identification component 204 can be configured to identify system parameters of interest using a sequence of identification processes. Mapping component 206 can be configured to apply curve-fitting techniques to system data to determine mapping functions between specification variables and tuning parameters (e.g., bandwidth) and between controller and crossover bandwidths. Optimization component 208 can be configured to determine a bandwidth operation range that satisfies all user-defined application performance specifications, and to select an optimal (or suitable) bandwidth within the range. The tuning component 210 can be configured to generate tuning parameters corresponding to the identified optimal bandwidth for implementation on a motion controller (e.g., an ADRC controller or other type of motion controller).

The interface component 212 can be configured to receive user input and to render output to the user in any suitable format (e.g., visual, audio, tactile, etc.). User input can be, for example, data values to be analyzed, identification of one or more performance specifications or variables and their corresponding desired values that are to be satisfied by the motion control design (tuning parameters) generated by the system 202, an instruction that initiates analysis and generation of suitable tuning parameters given a set of system data and the desired performance specifications, other user-defined parameters that play a role in the design analysis (e.g., a ratio $R_{oc}$ between observer and controller bandwidths, or other parameters), or other such input data. Output generated by the interface component 212 can include graphical and/or text-based prompts that guide the user through the process of entering necessary information, results of the design analysis (e.g., tuning parameter values), message indicating that the performance specifications entered by the user cannot be satisfied given the parameters of the motion system to be controlled, or other such output data. The one or more processors 214 can perform one or more of the functions described herein with reference to the systems and/or methods disclosed. Memory 216 can be a computer-readable storage medium storing computer-executable instructions and/or information for performing the functions described herein with reference to the systems and/or methods disclosed.

As noted above, the control design system 202 described herein applies a systematic control design approach with respect to the system parameters of a motion system. In this disclosure, the design techniques implemented by embodiments of the control design system 202 are described in connection with ADRC controllers, in which the primary tuning parameter is the controller bandwidth. However, the application specification-oriented design approach described herein is not limited to use with ADRC controllers, but rather can be applied to substantially any type of motion controller.

Figure 3:
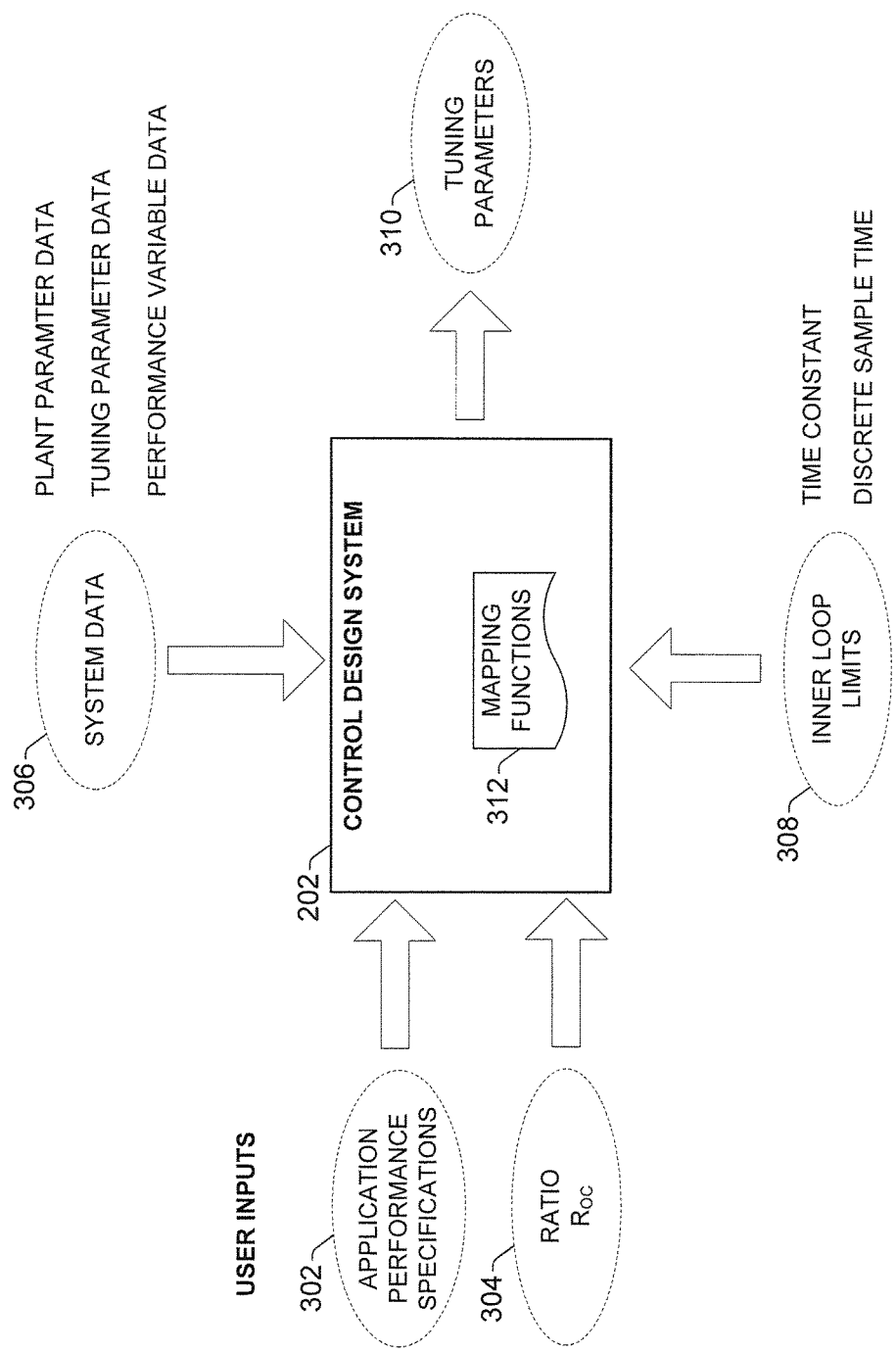
FIG. 3 is a generalized block diagram illustrating the inputs received and processed by control design system to generate suitable tuning parameters that satisfy one or more user-defined performance specifications.

FIG. 3 is a generalized block diagram illustrating the inputs received and processed by control design system 202 to generate suitable tuning parameters that satisfy one or more user-defined performance specifications. The control design system 202 can be provided with mapping functions 312 for a motion system for which tuning parameters are to be derived. Mapping functions 312 can be derived prior to the control design process (e.g., by mapping component 206) based on system data 306. In an example application, system data 306 can represent simulated, measured, or otherwise obtained values of a set of performance variables for the motion system over a range of different tuning and plant parameter values. System data 306 can include both independent variables of the motion system, as well as dependent variables whose values are dependent on one or more of the independent variables. The independent variables can comprise, for example, plant parameter data representing mechanical characteristics of the motion system, tuning parameter data representing values of tuning parameters of the motion controller (e.g., controller gains, controller bandwidth, etc.), or other such independent variables. Dependent variables represented by system data 306 can include values of one or more performance characteristics or metrics (e.g., maximum disturbance settling time, maximum deviation of the motion system from a target speed or position, torque or speed noise ratio, gain margin, phase margin, inertia variation range, open-loop cross-over frequency, etc.) that are dependent on values of the plant parameters and tuning parameters.

The system data 306 provided to the design system 202 can be obtained using any suitable data collection or generation technique, including but not limited to analytical analysis, simulation of the motion system under a range of different operating conditions (e.g., different simulated controller tunings, different plant parameters, etc.), or actual measured data collected from the motion system under a range of different operating conditions, system configurations, and/or controller tunings.

The inner loop limits 308 (e.g., the inner loop time constant and discrete sample time) of the motion control system are also provided to the control design system 202.

The control design system 202 allows the user to enter, as user inputs, one or more desired performance metrics as application performance specification data 302. The performance specification data 302 can include the identity and desired value of one or more application performance specifications or variables. Example performance variables can include, but are not limited to, the maximum disturbance deviation, the output settling time, the control signal noise level, the system variable variation tolerance range, gain margin, phase margin, inertia variation range, open-loop cross-over frequency or other such performance specifications.

Given the desired performance specifications defined by the performance specification data 302, the design system 202 determines—based on predetermined mapping function data in view of the desired performance specifications and the inner loop limits—a set of suitable tuning parameters 310 for the motion control system that will satisfy the defined performance specifications.

The system 202 also allows the user to set, as another user input, ratio data 304 defining a value of ratio $R_{oc}$, which represents a fixed ratio between observer bandwidth and controller bandwidth. The value of $R_{oc}$ serves as an optional tuning variable that determines the system variation tolerance range. As such, allowing the user to adjust this ratio affords a degree of control over the variation tolerance range of the system gain parameter.

In contrast to other design tools, control design system 202 allows the user to enter desired performance specifications as input parameters, and generates a set of tuning parameters that, when used to tune the motion controller, will result in motion system performance that satisfies the user-defined performance requirements. This can eliminate the trial-and-error approach to finding suitable tuning parameters that satisfy a performance requirement. Also, as will be described in more detail below, the pre-generated mapping functions that are referenced by the system 202 in connection with determining suitable tuning parameters eliminate the need to use an optimal solver or optimization algorithm, making the system suitable for use in embedded systems.

In general, control design system 202 implements the following processes in order to determine suitable tuning parameters that satisfy one or more user-defined motion control application specifications. These design steps will be described in more detail below in connection with an ADRC control system. The design technique is not limited by the presented order of these steps or processes; rather, the steps described below can be carried out in a different order than that presented below without departing from the scope of one or more embodiments of this disclosure.

Figure 4:
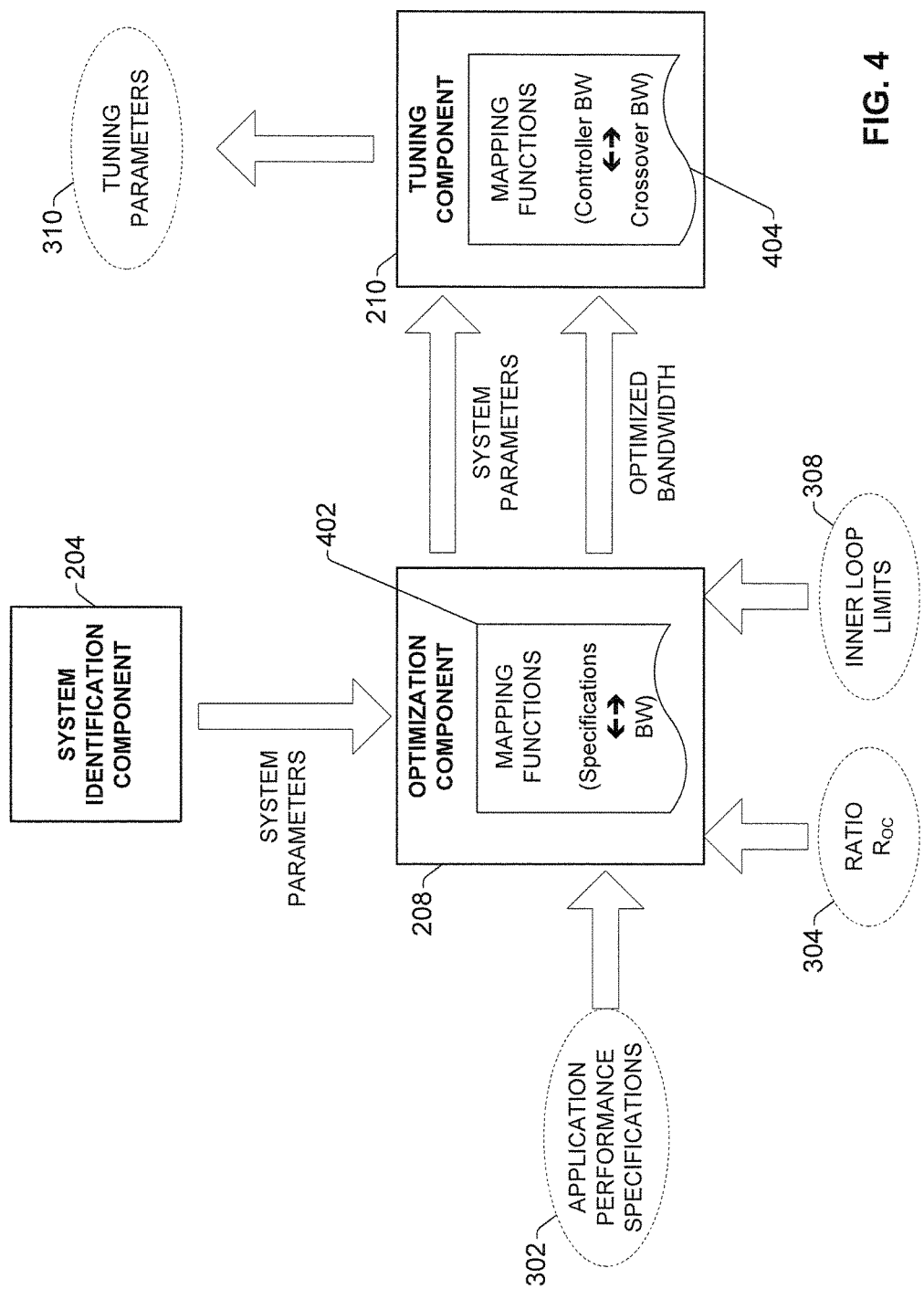
FIG. 4 is a block diagram illustrating general processing carried out by the components of the control design system.

FIG. 4 is a block diagram Illustrating the general processing carried out by the components of the control design system 202. Prior to the optimization process, the mapping component 206 derives and stores mapping functions 402 defining a mutual mapping between each of a set of performance variables and the primary tuning parameter. The mapping component 206 derives these mapping functions by applying a curve fitting operation on the system data 306, as will be described in more detail in connection with FIG. 7. In the case of ADRC controllers, the primary tuning parameter is the controller bandwidth, which can be either the ADRC controller bandwidth or the cross-over frequency. The mapping component 206 also derives and stores mapping functions 404 defining a mutual mapping between controller bandwidth and crossover frequency (or crossover bandwidth), as will be described in more detail in connection with FIG. 6. The controller bandwidth and crossover frequency have a monotone mutual mapping relationship given the system parameters and an optional tuning parameter, where the optional tuning parameter is the ratio between the controller bandwidth and the extended state observer (ESO) bandwidth.

With these mapping functions 402 and 404 established, design system 202 can carry out the optimization process. First, the system identification component 204 identifies the system parameters of the motion system (e.g. system gain, system pole, resonance frequency, etc.) using a sequence of identification processes. Next, the user enters the application performance specification data, 302, which specifies values of one or more performance variables or specifications (e.g., maximum disturbance deviation, settling time, control signal noise level, system variable variation tolerance range, etc.) that are to be satisfied by the control system design.

Next, the optimization component 208 determines the hard upper bound of the bandwidth from the inner loop time constant and the discreet sample time (defined by the inner loop limit data 308), together with other limiting factors of the motion system identified by the system parameters (e.g., the resonances in the motion system or other such mechanical characteristics). The optimization component 208 then determines the best realizable performances that can be achieved for each of the specified performance variables by the motion system based on the mapping from the hard upper bound of the controller bandwidth, as determined based on mapping functions 402.

Next, the optimization component 208 saturates the performance specifications by the determined best realizable values of the performance variables. The optimization component 208 then references mapping functions 402 to obtain the bandwidths corresponding to the saturated application specifications. These bandwidths are used as upper or lower bounds.

Finally, the minimum of the upper bound bandwidths and the maximum of the lower bound bandwidths are chosen as the limits of the valid tuning range of the bandwidth that will satisfy all the user-defined performance specifications. The optimization component 208 selects the geometric mean of the minimum and the maximum bandwidths as the optimal bandwidth, which is provided (together with the identified system parameters) to tuning component 210, which generates recommended tuning parameters 310 based on the optimized bandwidth. The tuning component 210 may reference mapping functions 404 to obtain one or more of the recommended tuning parameters 310.

The design system 202 substantially automates the process of identifying the system parameters of interest, optimizing the tuning parameter, and tuning the controller. The user experience is simple and straight-forward. The design system 202 affords the user the option of running the analysis with default application specifications, or manually selecting or adjusting one or more performance specifications to define an application goal. Then, the user can initiate the design process using a simple control (e.g., a virtual button or other control that can be actuated via a user interface display) to cause the system to identify the system parameters and obtain the optimal controller configuration.

An example design sequence that can be carried out by control design system 202 is now described. It is to be appreciated, however, that the scope of the invention is not limited to the example system described below.

The following example considers slow dynamics $G_{p0}$ of the motion system with or without resonances $G_r$.

$$G_p = G_{p0} G_r \tag{1}$$

The slow dynamics can be expressed as $$G_{p0} = \frac{1}{k(s+p)} \tag{2}$$

or $$G_{p0} = \frac{1}{ks(s+p)} \tag{3}$$

where k is a system gain parameter, and p is a system pole. In motion control the system gain parameter k is inertia, and the product kp is the friction coefficient.

The resonance of the motion system in the transfer function form is given by $$G_r = \frac{\frac{s^2}{\omega_{ar}^2} + \frac{2\xi_{ar} s}{\omega_{ar}} + 1}{\frac{s^2}{\omega_r^2} + \frac{2\xi_r s}{\omega_r} + 1} \tag{4}$$

where $\omega_{ar}$ and $\omega_r$ are anti-resonance and resonance frequencies, respectively, and $\xi_{ar}$ and $\xi_r$ are anti-resonance and resonance damping ratios. Note that the motion system can have multiple resonances.

For ADRC control systems, the extended state observer bandwidth $\omega_0$ is related to the controller bandwidth $\omega_c$ according to a fixed ratio $R_{oc}$. Thus, the controller bandwidth $\omega_c$ is the only tuning parameter.

Figure 5:
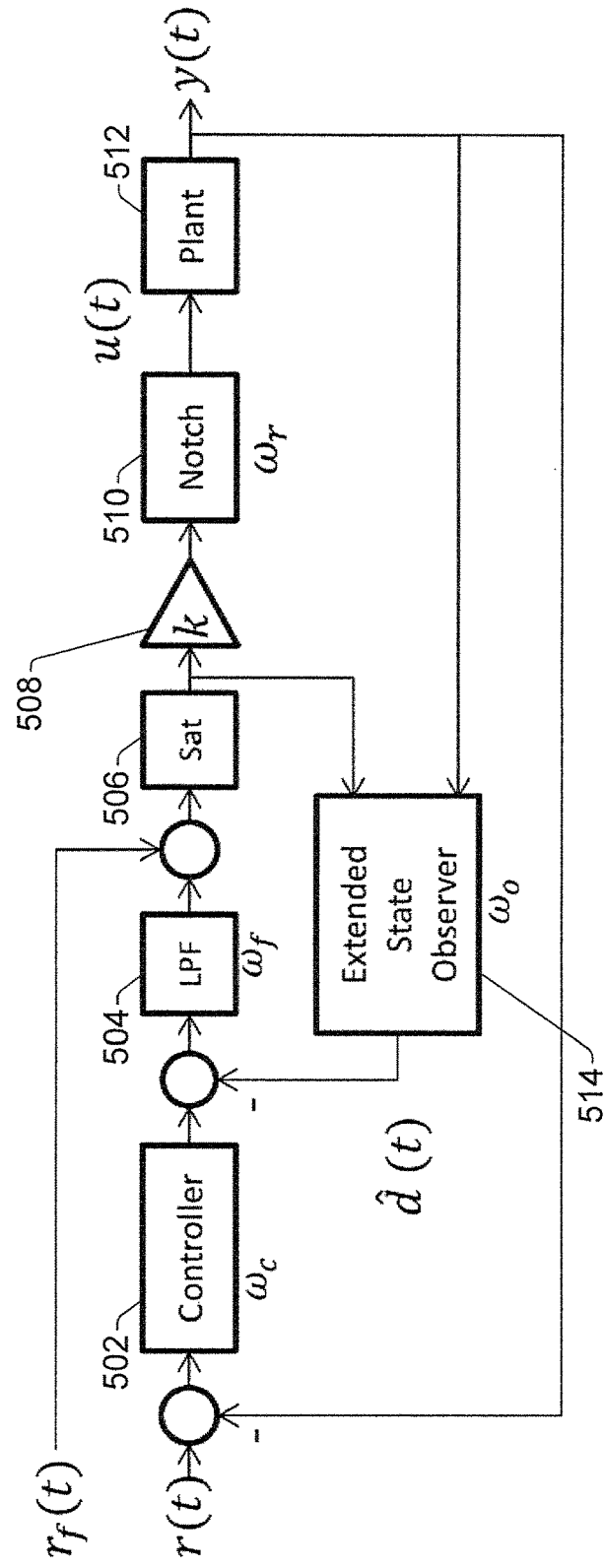
FIG. 5 is a block diagram illustrating a new ADRC control structure.

FIG. 5 is a block diagram illustrating an ADRC control structure. According to this control structure, the feedback signal y(t) measured from the plant 512 (e.g., the controlled mechanical system) is compared to the reference signal r(t), which represents a time-dependent reference position or speed. The comparison result is passed to the control part 502 of the ADRC motion system. Then, the estimated disturbance d̂(t) is subtracted from the output of the ADRC control part 502. The subtraction result passes through a low-pass filter 504 and then is added by the feedforward signal $r_f(t)$. The addition result goes through a saturation block 506. The output of the saturation block 506 is fed to the extended state observer (ESO) 514, and is then multiplied by a system gain parameter k at multiplication block 508 and passed to a notch filter 510 to generate the ADRC control signal, which is applied to the plant 512.

The system gain parameter k is the ratio between the control signal and the highest order derivative of the output signal of a plant model. In motion control, k is the total inertia of the system.

The order of the low-pass filter 504 is selected to make the sensitivity function of the controlled system strictly proper. For example, if the system is a speed loop control system, the order of the low-pass filter 504 is 1. Alternatively, if the system is a position loop control system, the order of the low-pass filter 504 is 2.

Now there are three parameters to determine: controller bandwidth $\omega_c$, observer bandwidth $\omega_o$, and ADRC low-pass filter bandwidth $\omega_f$. In this design, $\omega_f$ is related to the crossover frequency $\omega_x$ by the ratio $R_{fx}=\omega_f/\omega_x$ as a predefined constant (e.g., 10). Also, $\omega_o$ is related to $\omega_c$ by the ratio $R_{oc}=\omega_o/\omega_c$. Therefore, the mapping between the tuning parameter $\omega_c$ and the crossover frequency $\omega_x$ is monotonic given the system parameters and ratio $R_{oc}$. As such, there are unique mapping and inverse mapping functions between $\omega_c$ and $\omega_x$.

Through the Bode analysis, the influence of the ratio $R_{oc}$ is discovered. As $R_{oc}$ decreases, the ESO catches lower frequencies of the disturbance dynamics, which contributes to the phase curve around the crossover frequency rising up in the loop gain Bode, and in turn allows more up-and-down shifting of the gain curve before the phase margin reaches the desired minimum value. Therefore, in the present design system 202, ratio $R_{oc}$ is used as an optional tuning parameter to adjust the system parameter variation tolerance. The lower the value of $R_{oc}$, the wider variation tolerance range of the system gain parameter k.

Figure 6:
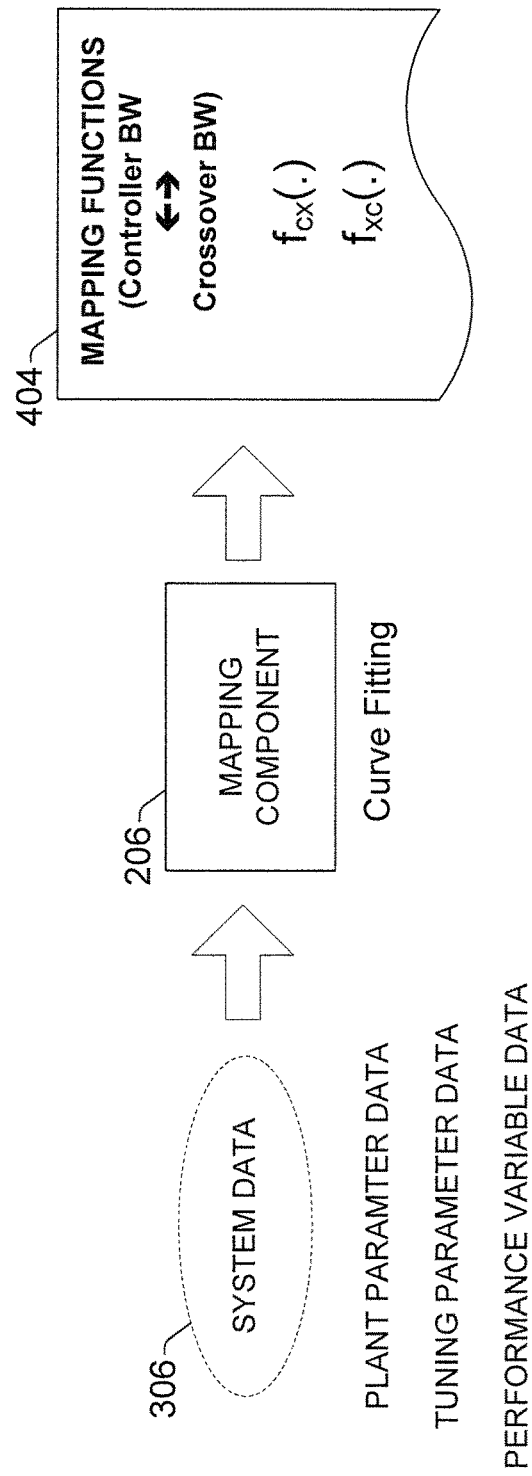
FIG. 6 is a block diagram illustrating generation of mapping functions between controller bandwidth and crossover bandwidth by an optimization component.

To get the mapping functions 404 between $\omega_c$ and $\omega_x$, the mapping component 206 applies a multiple independent variable curve-fitting method to system data provided to the design system 202 prior to the design optimization process. FIG. 6 is a block diagram illustrating generation of mapping functions 404 between controller bandwidth $\omega_c$ and crossover bandwidth (or crossover frequency) $\omega_x$ by the mapping component 206. The system data 306 provided to the design system 202 can be obtained using any suitable data collection or generation technique, including but not limited to analytical analysis, simulation of the motion system under a range of different operating conditions (e.g., different simulated controller tunings, different plant parameters, etc.), or actual measured data collected from the motion system under a range of different operating conditions and/or system configurations. System data 306 can comprise, for example, plant parameter data representing mechanical characteristics of the motion system, tuning parameter data representing a range of values of tuning parameters (e.g., controller gains, controller bandwidth, etc.) of the motion controller, or other such independent variables. System data 306 can also comprise performance variable data representing values of one or more performance characteristics or metrics (e.g., maximum disturbance settling time, maximum deviation of the motion system from a target speed or position, torque or speed noise ratio, gain margin, phase margin, inertia variation range, open-loop cross-over frequency, etc.) corresponding to a range of values of the independent variables and the key tuning parameter.

Mapping component 206 obtains the mapping functions 404 by applying a multiple independent variable curve fitting method to the data 306. The resulting mapping functions 404 are given as $$\omega_x = f_{cx}(\omega_c, R_{oc}, p) \quad (5)$$

$$\omega_c = f_{xc}(\omega_x, R_{oc}, p) \quad (6)$$

where $f_{cx}(.)$ is the mapping function from $\omega_c$ to $\omega_x$, and $f_{xc}(.)$ is the mapping function from $\omega_x$ to $\omega_c$. Each mapping is a function of the ratio $R_{oc}$ and system pole p. Any suitable curve fitting technique can be used to obtain the mapping functions represented by equations (5) and (6). One such curve fitting technique capable of mapping between variables of interest (e.g., $\omega_x$ and $\omega_c$) given multiple independent variables is described in U.S. patent application Ser. No. 15/276,937, the entirety of which is incorporated herein by reference.

The mapping functions $f_{cx}(.)$ and $f_{xc}(.)$ consist of coefficient arrays and mathematical expressions that can be stored as mapping function data (e.g., matrix information) and executed in an embedded system without the use of an optimal solver or optimization algorithm.

With the mapping functions $f_{cx}(.)$ and $f_{xc}(.)$ obtained, the user can enter a selected value of ratio $R_{oc}$, which determines the variation tolerance of the system gain parameter k, and use either $\omega_x$ or $\omega_c$ to tune the performance of the motion system.

For convention, crossover bandwidth $\omega_x$ is used as an intermediate point to connect the performance specifications to the ADRC tuning parameters. In this example, "bandwidth" refers to crossover bandwidth. However, as an alternative, the ADRC controller bandwidth oc can be used as the intermediate point as well.

The mapping functions between the performance variables and bandwidth are now described. As noted above, the multiple independent variable curve-fitting method is applied by the mapping component 206 to get the mapping functions 402 between the application specifications and the bandwidth, given the system parameters k and p, and the ratio $R_{oc}$.

In this example, three application performance specifications are defined by the user (e.g., by entering values for the selected performance specifications via an interface display generated by the interface component 210) or inherited from the design system's default settings. In some embodiments, the interface component 212 can generate a display that renders a set of available performance variables that can be selected by the user. The user may select one or more of the performance variables that are considered important based on the requirements of the motion system to be tuned, and enter values for each selected performance variables, where the values entered for the selected performance variables represent the desired application specifications that are to be satisfied by the control system design. Some embodiments may also recommend default performance specifications for one or more performance variables, which may be accepted or modified by the user.

In this example, the three selected application specifications are (1) the maximum disturbance settling time $t_d$, defined as the time required for the disturbed motion system output to return to the region of 10% of maximum deviation; (2) the maximum disturbance deviation value $y_d$, defined as the maximum deviation given normalized step disturbance in the control signal; and (3) the control signal variation $n_u$, defined as the maximum noise variation in controller output torque signal to the motion system.

The mapping functions 402 between the bandwidths (assumed to be crossover bandwidth in the present example, but may also be controller bandwidth) and corresponding application specifications are described by the following functions:

$$\omega_{td} = g_{td}(t_d, R_{oc}, k, p) \quad (7)$$

$$t_d = h_{td}(\omega_{td}, R_{oc}, k, p) \quad (8)$$

$$\omega_{yd} = g_{yd}(y_d, R_{oc}, k, p) \quad (9)$$

$$y_d = h_{yd}(\omega_{yd}, R_{oc}, k, p) \quad (10)$$

$$\omega_n = g_g(n_y, n_u, R_{oc}, k, p) \quad (11)$$

$$n_u = h_n(n_y, \omega_n, R_{oc}, k, p) \quad (12)$$

In equations (7)-(12), $\omega_{td}$, $\omega_{yd}$, and $\omega_n$ are the bandwidths corresponding to the application-specified disturbance settling time $t_d$, disturbance deviation value $y_d$, and control (torque) signal variation $n_u$, respectively. Functions $g_{td}(.)$ and $h_{td}(.)$ are mapping functions from disturbance settling time $t_d$ to corresponding bandwidth, and vice versa, respectively. Functions $g_{yd}(.)$ and $h_{yd}(.)$ are mapping functions from maximum disturbance deviation value $y_d$ to corresponding bandwidth, and vice versa, respectively. Functions $g_n(.)$ and $h_n(.)$ are mapping functions from control signal variation $n_u$ to corresponding bandwidth, and vice versa, respectively. Variable $n_y$ in equations (11) and (12) is the maximum noise variation in the output signal given a constant control input, obtained through the system identification.

Figure 7:
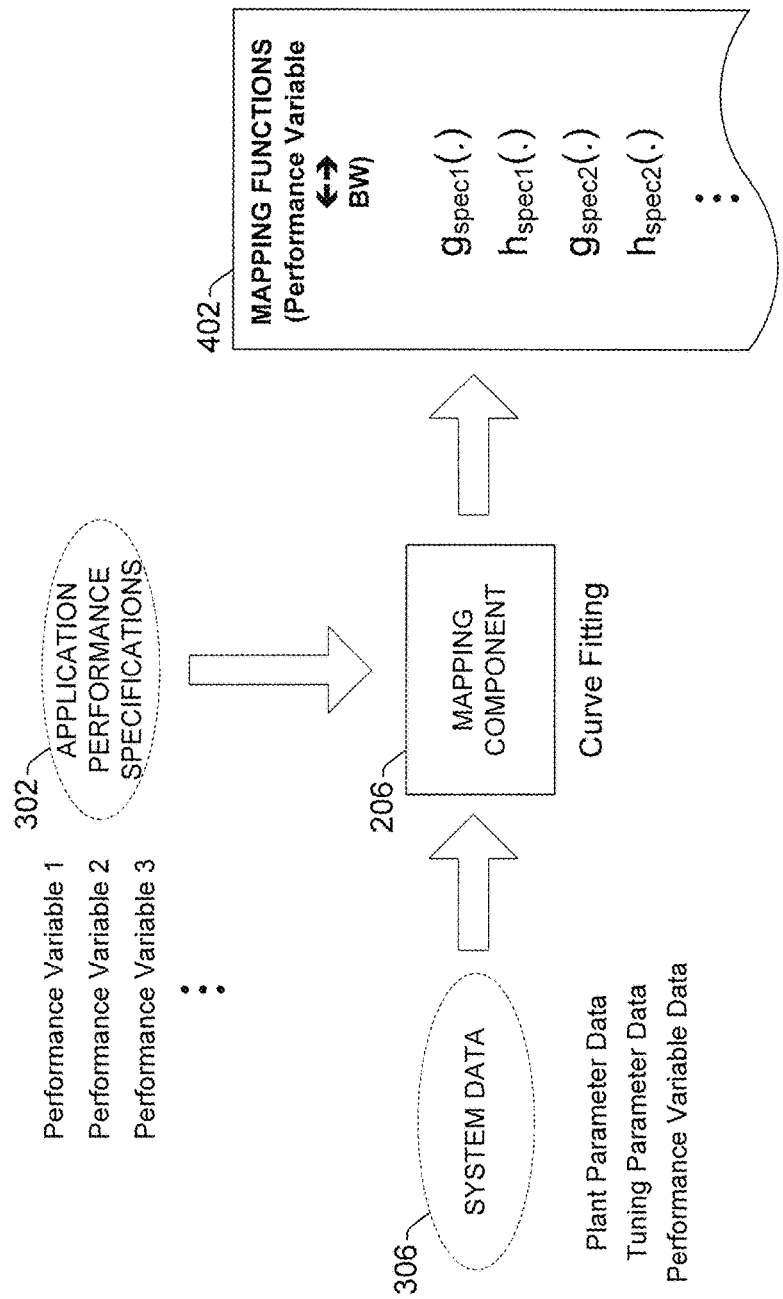
FIG. 7 is a block diagram illustrating generation of mapping functions by an optimization component.

The mapping functions 402 given by equations (7)-(12) are mathematical approximations. The mapping component 206 obtains each mapping function and its inverse separately. It is to be appreciated that the design system 202 is not limited to the application performance specifications described above ($t_d$, $y_d$, and $n_u$), but rather can be applied to substantially any measurable or analyzable variable of the motion system (e.g., gain margin, phase margin, maximum tracking error, system gain variation tolerance range, etc.). FIG. 7 is a block diagram illustrating generation of mapping functions 402 by the mapping component 206. In general, for each application performance specification provided to the design system 202 by the user, the mapping component 206 uses a multiple independent variable curve-fitting process to obtain a mapping function from the application specification to its corresponding bandwidth, as well as the inverse mapping function. Since system data 306 can include performance data collected (or simulated) for a controlled mechanical system over a range of different tuning parameters and plant variables, the mapping component 206 can apply a multiple independent variable curve fitting process to determine the mapping between each specified performance variable and the bandwidth of the motion control system.

In an example, non-limiting curve fitting approach that takes into account the multiple independent variables (e.g., the tuning parameters, plant parameters, etc.) that determine the value of each performance variable, the mapping component 206 may first establish curve fitting relationships (A) between one of the performance variables (spec1) and a first independent variable ($v_a$) for each case of value sets of the rest of the independent variables (that is, other independent variables not including $v_a$). Then, the mapping component 206 establishes curve fitting relationships (B) between the coefficients of A and a second independent variable ($v_b$) for each case of value sets of the rest of the independent variables (that is, other independent variables not including $v_a$ and $v_b$). This recursive curve fitting process is repeated for all independent variables to obtain curve fitting relationships for all the independent variables.

Rather than finding the coefficients for a predefined single nonlinear mapping function, this multi-level curve fitting approach recursively applies curve fitting techniques on the coefficients of a previous curve fitting with respect to each independent variable. In this way, a function that maps between the bandwidth and a performance variable given multiple independent variables (e.g., plant parameters and/or other tuning parameters) can be obtained with good precision. This technique is described in more detail in U.S. patent application Ser. No. 15/276,937, the entirety of which is incorporated herein by reference. However, it is to be appreciated that the design system described herein is not limited to this multi-level curve fitting approach. Rather, any suitable curve fitting technique can be applied to the system data 306 in order to determine mapping functions 402.

Figure 8:
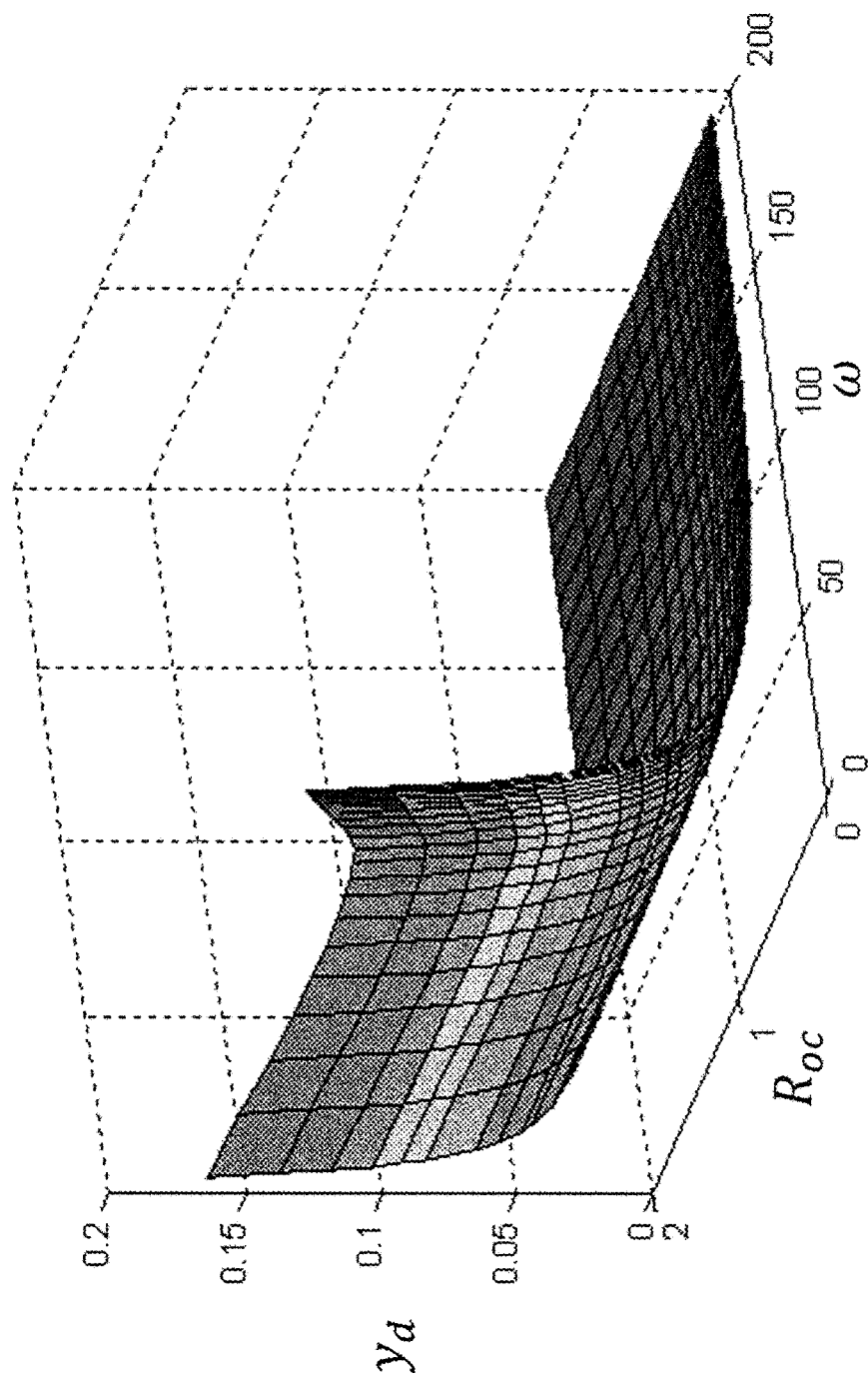
FIG. 8 is a three-dimensional graph of part of a mapping function from bandwidth to maximum disturbance deviation $y_d$ given fixed system parameters.
Figure 9:
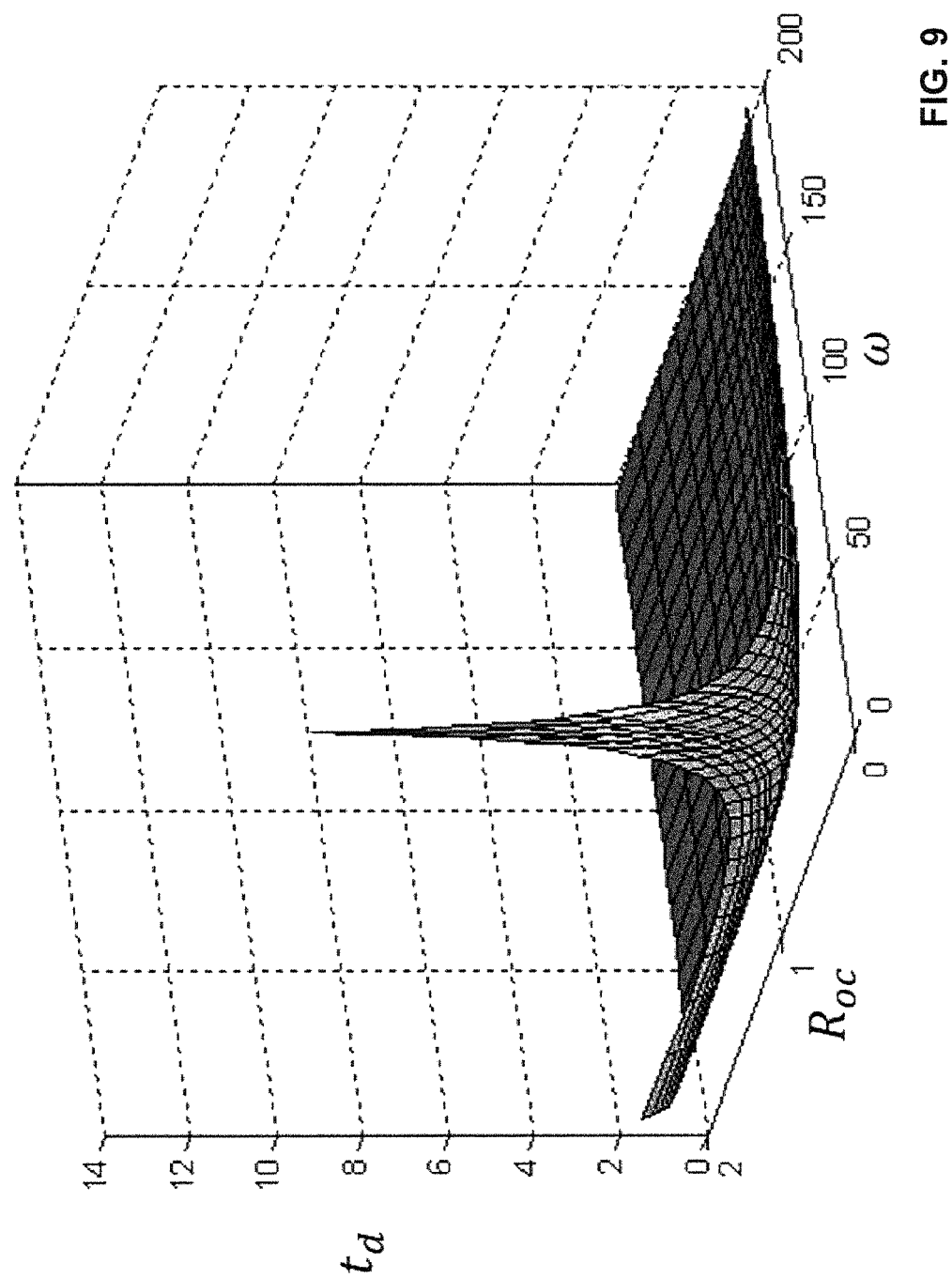
FIG. 9 is a three-dimensional graph of part of a mapping function from bandwidth to maximum disturbance settling time $t_d$ given fixed system parameters.
Figure 10:
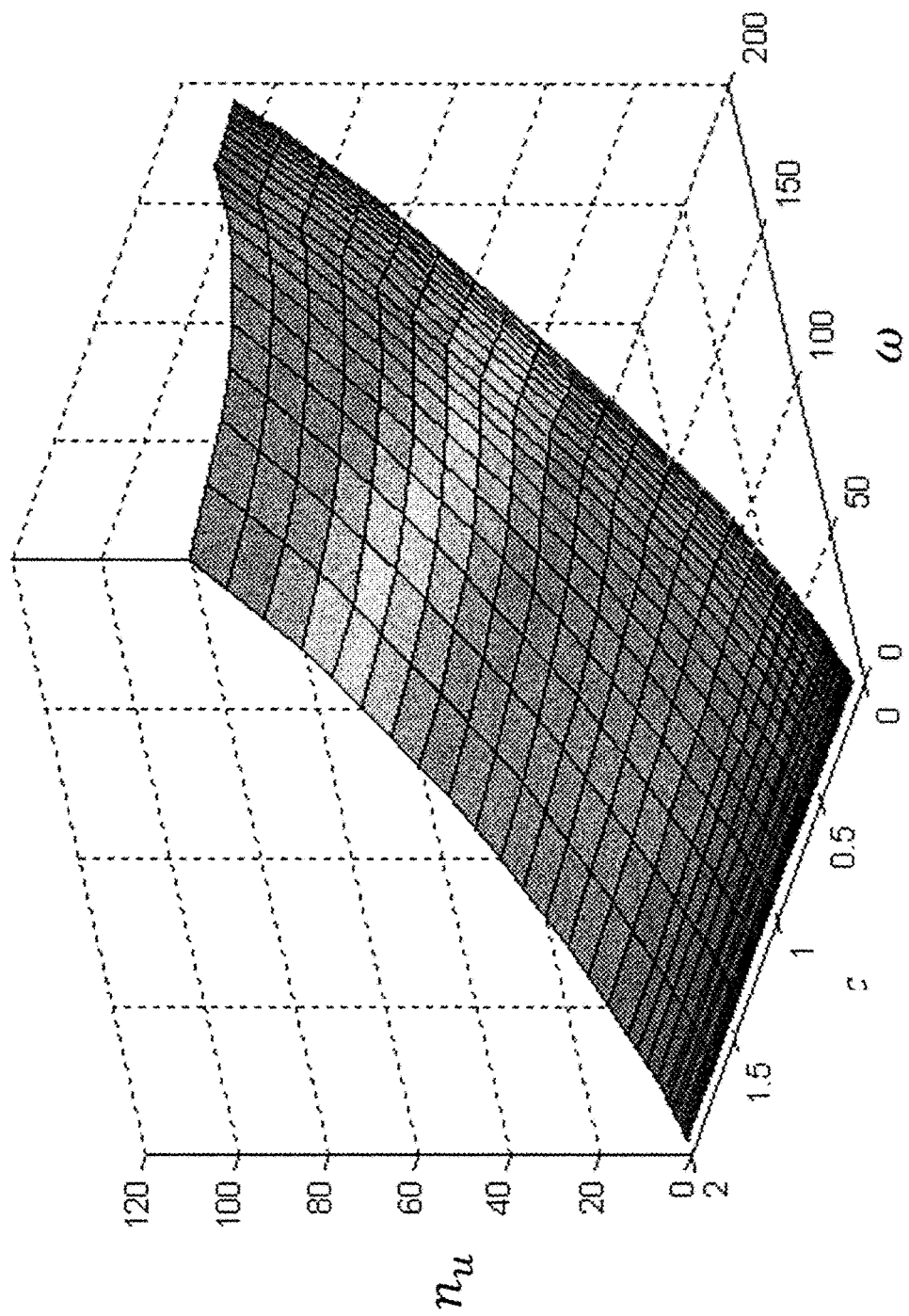
FIG. 10 is a three-dimensional graph of part of a mapping function from bandwidth to maximum control noise variation $n_u$ given fixed system parameters.

Prior to running the optimization process, the mapping functions (7)-(12) can be stored as matrix data and executed in real-time motion control applications, thereby eliminating the need for an optimal solver and making design system, 202 suitable for use in embedded systems during runtime. While it is difficult to graphically illustrate the mapping functions mapping functions (7)-(12) since they are multi-dimensional and depend on more than two independent variables, FIGS. 8-10 depict three-dimensional graphs showing reduced dimension data of the mapping functions (7)-(12) with fixed system parameters. FIG. 8 is a three-dimensional graph of part of the mapping function from bandwidth to maximum disturbance deviation $y_d$ given fixed system parameters. FIG. 9 is a three-dimensional graph of part of the mapping function from bandwidth to maximum disturbance settling time $t_d$ given fixed system parameters. FIG. 10 is a three-dimensional graph of part of the mapping function from bandwidth to maximum control noise variation $n_u$ given fixed system parameters and fixed maximum output noise variation $n_y$.

Figure 11:
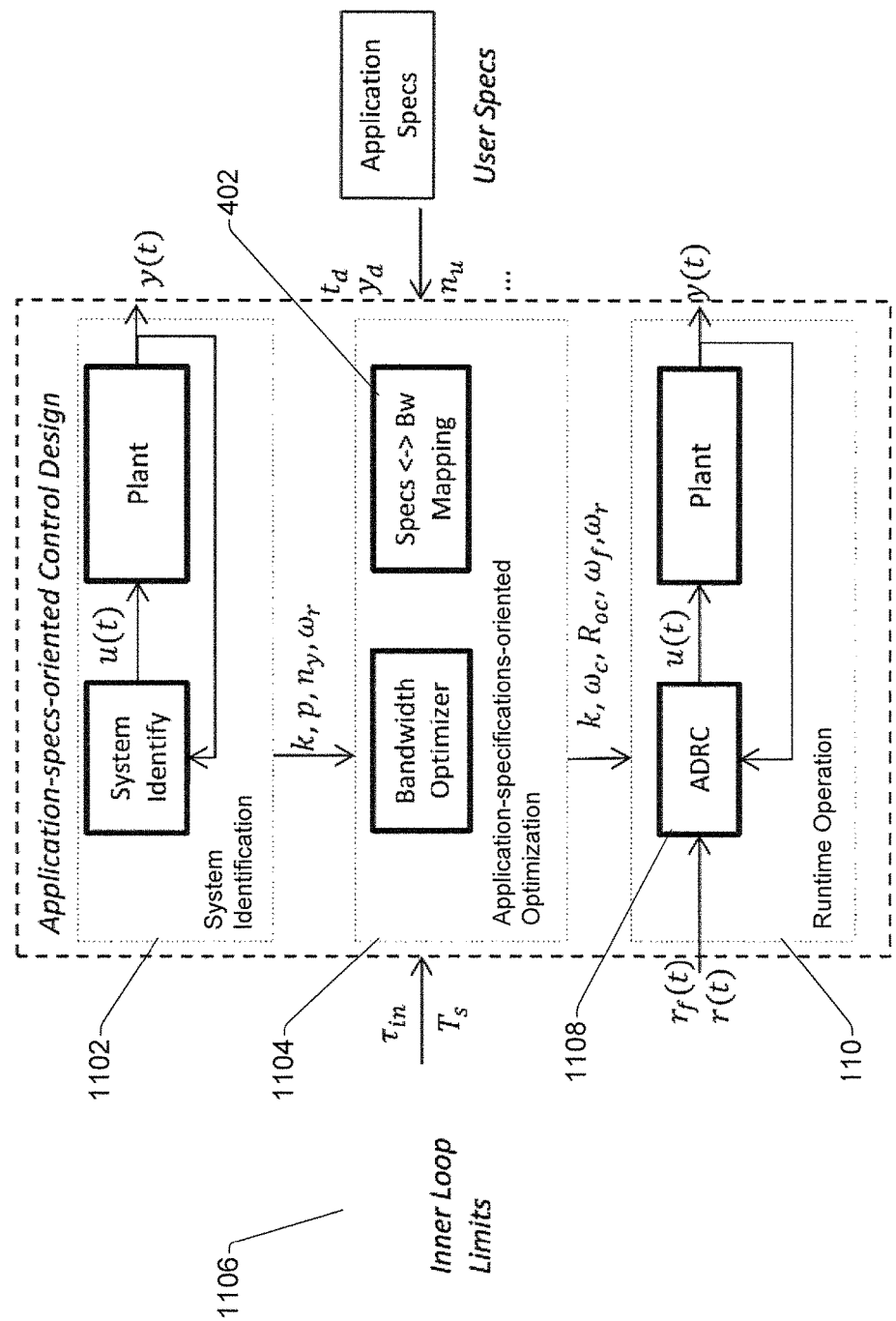
FIG. 11 is a block diagram illustrating the processing carried out by the components of the control design system.

A general overview of the identification, optimization, and tuning processes is now provided. FIG. 11 is a block diagram illustrating the processing carried out by the components of control design system 202. First, through a system identification process 802 performed by the system identification component 204, the system parameters of interest are obtained and passed to the optimization component 208 for optimization processing. In the example processing illustrated in FIG. 11, the system parameters of interest identified by the system identification component 204 are the system gain parameter k, the system pole p, the maximum noise variation $n_y$ in the output signal y(t) (given a constant control input), and the resonance frequency $\omega_r$. System identification component 204 can identify these parameters of interest based using any suitable identification algorithms applied to measured data for the motion system.

The optimization component 208 then performs optimization processing 1104. During this stage, given the identified system parameters (in this example, k, p, $n_y$, and $\omega_r$), and limited by the constraints 1106 inherited from the inner loops (in this example, the time constant $\tau_{in}$, and sample time $T_s$ of the inner loop, which are also provided to the design system 202 as inner loop limit data 308), the bandwidths mapped from the user-defined application specifications are obtained (using the previously derived and stored mapping function data 402). The optimization component 208 then performs a bandwidth optimization process on the bandwidths obtained for the respective user-defined application specifications. In particular, the bandwidth optimization process 1104 determines the maximum of the lower bound bandwidths and the minimum of the upper bounds bandwidths to determine the operational bandwidth range that satisfies the user-defined performance specifications, determines a presumed optimal bandwidth within this range, and outputs the selected optimal bandwidth as a recommended bandwidth with which to tune the motion control system.

The ratio $R_{oc}$ between the ADRC controller bandwidth $\omega_c$ and the ESO bandwidth $\omega_o$ can be adjusted by the user, and serves as input to the performance-oriented optimization process. This ratio represents the variation tolerance range of the system gain parameter k. In a more complex example, this ratio can be mapped to the variation tolerance range of the system gain parameter by applying a similar mapping method, and treating the variation tolerance range of the system gain parameter k as the application specification input.

Finally, the system gain parameter k and the tuning parameters (in this example, $\omega_c$, $R_{oc}$, $\omega_f$, and $\omega_r$) are passed to the ADRC controller in the runtime operation to facilitate tuning the controller.

The system identification, bandwidth optimization, and tuning processes are now described in more detail. First, identification of the system parameters of interest by the control design system 202 is discussed. In the present example, the system identification component 204 applies a system identification process 1102 to identify three sets of system parameters of interest. The first set is the slow dynamics of the system, represented by the system gain parameter k and system pole p of the system (see equations (2) and (3) above). The system identification component 204 can apply any suitable identification algorithm to identify these slow dynamics.

The second set is the output noise level of the plant—denoted as $n_y$—given a constant input signal. The system identification component 204 can identify this output noise level using any suitable algorithm capable of detecting the maximum variation of the output signal during a certain time period with a constant control signal.

The third set is the resonance—frequency, peak, and width—of the plant (the controlled mechanical system), which can be identified by the system identification component 204 using any suitable vibration detection algorithm. The resonance frequency, peak, and width are denoted as $\omega_r$, $a_r$, and $w_r$, respectively.

Next, the optimization process is discussed. The optimization process 1104 carried out by the optimization component 208 for determining a suitable bandwidth for that satisfies the user-defined application performance specifications comprises multiple steps. These steps are now described in connection with FIG. 12, which is a diagram of a linear bandwidth range that illustrates the determination of the operational bandwidth range and the optimal bandwidth by the optimization component 208 according to this example.

First, the upper bound of the bandwidth due to the inner loop and sample time is determined as $$\omega_{in} = \frac{\eta_{in}}{\left(\tau_{in} + \frac{T_s}{2}\right)} \tag{13}$$

where $\eta_{in}$ is a defined safe ratio that keeps the bandwidth away from the inner loop limits (e.g., 0.2). The upper bound bandwidth $\omega_{in}$ represents the largest safe bandwidth that can be achieved without violating the inner loop dynamics and sample time.

Next, if resonances are detected by the system identification process, the upper bound of the bandwidth due to resonance is determined as $$\omega_{r1} = \eta_w \omega_r \tag{14}$$

where $\eta_r$ is a defined safe ratio to keep the bandwidth away from the lowest resonance frequency (e.g., 0.2).

Figure 12:
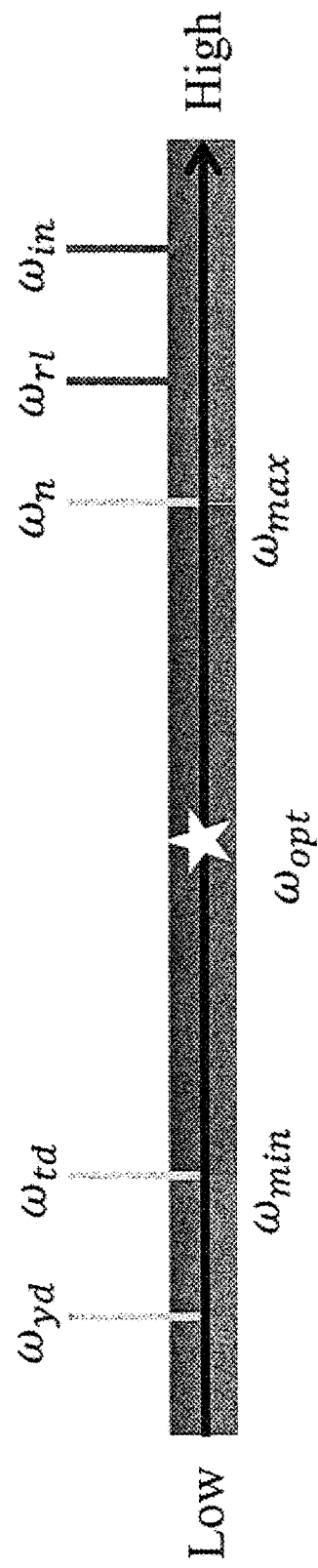
FIG. 12 is a diagram of a linear bandwidth range that illustrates the determination of the operational bandwidth range and the optimal bandwidth by the optimization component.

The optimal bandwidth must remain below the two upper bounds defined by equations (13) and (14). Accordingly, the lower of the two bandwidths $\omega_{in}$ or $\omega_{r1}$ is used in the subsequent step as the upper bound on the bandwidth. As shown in FIG. 12, the upper bound $\omega_{r1}$ due to resonance is the lower of the two upper bound bandwidths in the present example (though this may not be the case in all scenarios), and is therefore used as the upper bound.

Next, the lower of $\omega_{in}$ or $\omega_{r1}$ is used to determine the best performance that can be achieved for each of the user-defined application specifications $t_d$, $y_d$, and $n_u$ based on the mapping functions (8), (10), and (12) given above. That is, the lower of the two bandwidths $\omega_{in}$ or $\omega_{r1}$ ($\omega_{r1}$ in the case illustrated in FIG. 12) is input into mapping functions (8), (10), and (12) as the bandwidths $\omega_{td}$, $\omega_{yd}$, and $\omega_n$—together with the system parameters k, p, and $n_y$ and the ration $R_{oc}$—in order to obtain the assumed best obtainable values for the respective performance specifications $t_d$, $y_d$, and $n_u$:

$$t_{d,min} = h_{td}(\min(\omega_{in},\omega_{r1}),R_{oc},k,p) \tag{15}$$

$$y_{d,min} = h_{yd}(\min(\omega_{in},\omega_{r1}),R_{oc},k,p) \tag{16}$$

$$n_{u,max} = h_n(n_y,\min(\omega_{in},\omega_{r1}),R_{oc},k,p) \tag{17}$$

The values $t_{d,min}$, $y_{d,min}$, and $n_{u,max}$ obtained from the mapping functions 402 are the minimum achievable disturbance settling time, the minimum achievable disturbance deviation, and the maximum achievable control signal variation, respectively, due to inner loop and resonance constraints. As noted above, the design system 202 is not limited to determination of suitable tuning bandwidth based on the three particular application specifications of this example. In general, the optimization component 208 will determine the presumed best obtainable values for all application performance specifications entered or selected by the user, regardless of the number of specifications provided.

Then, the optimization component 208 saturates the user-defined performance specification values (the desired values of the performance specification variables input by the user) with respect to the best achievable specifications:

$$t_d = \max(t_d, t_{d,min}) \tag{18}$$

$$y_d = \max(y_d, y_{d,min}) \tag{19}$$

$$n_u = \min(n_u, n_{u,max}) \tag{20}$$

That is, if a user-defined value of a performance specification variable for which lower values are preferable (e.g., deviations $t_d$ and $y_d$) is less than the determined minimum attainable value of that variable, the performance specification variable is set to the minimum attainable value. Similarly, if a user-defined value of a performance specification variable for which higher values are preferable (e.g., control signal variation $n_u$) is higher than the determined maximum attainable value for that variable, the value of the performance specification is set to the maximum attainable value. Alternatively, if a user-defined value of a performance variable does not violate a determined maximum or minimum attainable value, the user-defined value for the performance variable is used.

Then, using these saturated values of the user-defined performance variables and the mapping functions of equations (7), (9), and (11) the bandwidths corresponding to the respective performance variables are obtained:

$$\omega_{td} = g_{td}(t_d, R_{oc}, k, p) \quad (7)$$

$$\omega_{yd} = g_{yd}(y_d, R_{oc}, k, p) \quad (9)$$

$$\omega_n = g_n(n_y, n_u, R_{oc}, k, p) \quad (11)$$

These three performance variable-specific bandwidths are shown in their relative locations on the bandwidth range of FIG. 12. These bandwidths represent the controller bandwidths that optimize their corresponding performance variables.

Next, the largest value of all the lower bound bandwidths and the lowest value of all the upper bound bandwidths are selected as the minimum bandwidth $\omega_{min}$ and the maximum bandwidth $\omega_{max}$, respectively, of the operational bandwidth range. The lower bound bandwidths are those corresponding to performance specifications for which lower values correlate to better performance, while the upper bound bandwidths are those corresponding to performance specifications for which higher values correlate to better performance. In the present example, since deviations $t_d$ and $y_d$ are lower bounds and control signal variation $n_u$ is an upper bound, the minimum and maximum bandwidths are determined according to $$\omega_{min} = \max(\omega_{td}, \omega_{yd}) \quad (21)$$

$$\omega_{max} = \min(\omega_n) \quad (22)$$

In the present example, of the bandwidths given by equations (7), (9), and (11), $\omega_d$ and $\omega_{yd}$ are lower bound bandwidths. Bandwidth $\omega_{td}$ is larger than $\omega_{yd}$, and is therefore set to be the minimum bandwidth $\omega_{min}$, as shown in FIG. 12. Since $\omega_n$ is the only upper bound bandwidth, this bandwidth is set to $\omega_{max}$. The bandwidths $\omega_{min}$ and $\omega_{max}$ represent the limits of the bandwidth range within which all defined performance specifications will be satisfied.

If $\omega_{min}$ is found to be greater than $\omega_{max}$, this indicates that there is no bandwidth that satisfies all the application specifications. Accordingly, if the optimization process determines that $\omega_{min}$ is greater than $\omega_{max}$, the design system 202 (e.g., the interface component 212) can render a notification to the user that one or more values of the user-defined application specifications should be relaxed so that an obtainable bandwidth can be determined.

Otherwise, if $\omega_{min}$ is appropriately less than $\omega_{max}$, the optimization component 208 selects as the optimal bandwidth within the range defined by $\omega_{min}$ and $\omega_{max}$. In the present example, the optimal bandwidth is taken to be the geometric mean of the minimum and maximum bandwidths:

$$\omega_{opt} = \sqrt{\omega_{min} \omega_{max}} \quad (23)$$

Summarizing the foregoing optimization process, the upper bound $\omega_{in}$ of the bandwidth is first determined based on the inner loop limit $T_s$ and $\tau_{in}$ provided to the design system 202, using equation (13) above. If resonances are present in the motion system, the alternative upper limit for the bandwidth $\omega_{rl}$ is determined based on the resonance bandwidth $\omega_r$, according to equation (14) above. Since $\omega_{rl}$ is lower than $\omega_{in}$ in the present example, $\omega_{rl}$ is selected as the upper bound on the bandwidth. The bandwidths $\omega_{yd}$, $\omega_{td}$, and $\omega_n$ represent the bandwidths corresponding to the determined best achievable values for each of the performance specifications $t_d$, $y_d$, and $n_u$ specified by the user. The presumed best achievable values of the selected performance specifications are determined based on the mapping functions given by equations (15), (16), and (17) above, which are functions of the lesser of $\omega_{rl}$ or $\omega_{in}$ (in this case, $\omega_{rl}$), as well as the identified system parameters k, p, and $n_y$, and the adjustable ratio $R_{ar}$. The user-defined values of the application specifications are then saturated with respect to these best achievable values. Once these saturated values of the performance are determined, mapping functions (7), (9), and (11) are used to obtain the bandwidths $\omega_{yd}$, $\omega_{td}$, and $\omega_n$ corresponding to these saturated performance specification values. The optimal bandwidth range is then taken to be defined as the range between the largest value of all the lower bounds (in this case $\omega_{td}$) and the lower values of all the upper bounds (in this case, $\omega_n$). Finally, the geometric mean of this range given by equation (23) is used to determine the optimal bandwidth $\omega_{opt}$.

Returning now to FIG. 11, after the optimal bandwidth $\omega_{opt}$ is determined, the tuning component 210 of design system 202 can set the motion control tuning parameters for ADRC control. In this example, the tuning parameters are k, $\omega_c$, $R_{oc}$, and $\omega_f$. The system gain parameter k was derived from the system identification process 1102 carried out by the system identification component 204, and the ratio $R_{oc}$ was previously selected by the user. Since the optimal bandwidth $\omega_{opt}$ represents the crossover bandwidth $\omega_x$ in this example, the tuning component 210 determines the controller bandwidth $\omega_c$ based on the optimal crossover bandwidth $\omega_{opt}$, ratio $R_{oc}$, and system pole p (determined from the system identification process 1102) using the mapping function represented by equation (6) (e.g., by using the value of $\omega_{opt}$ as the value of $\omega_x$ in the mapping function). The tuning component 210 derives the filter bandwidth $\omega_f$ from the optimal crossover bandwidth $\omega_{opt}$ based on the predefined constant ratio $R_{fx} = \omega_f/\omega_x$ (where $\omega_x$ is set to be $\omega_{opt}$).

The parameters of the notch filter 510 (see FIG. 5) can be configured per industry convention, given parameters $\omega_r$, $a_r$, and $w_r$.

Figure 13:
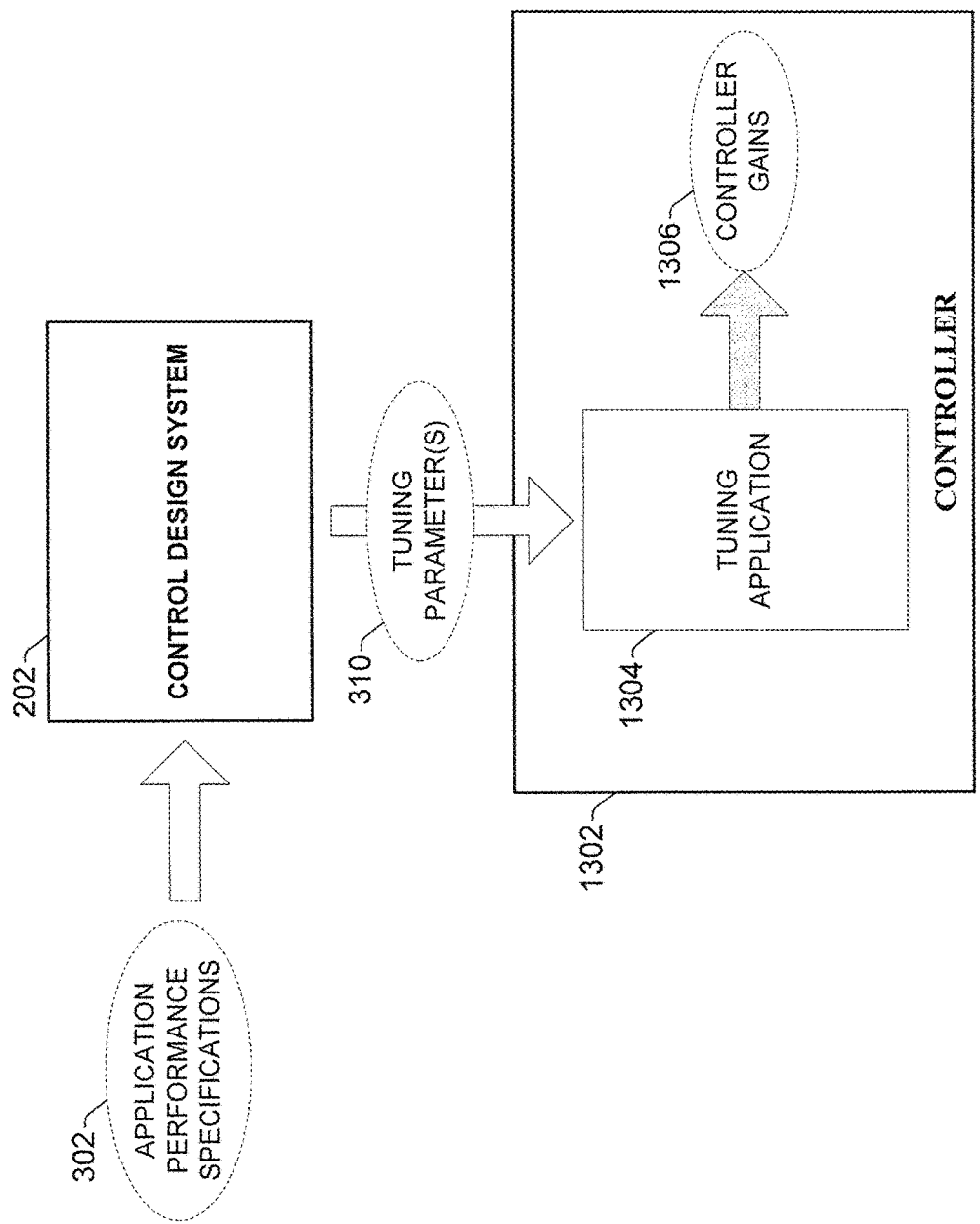
FIG. 13 is a block diagram illustrating the export of the tuning parameter values generated by the control design system to a motion controller.

In some embodiments, the interface component 212 can render the tuning parameters obtained by the optimization component 208 on a display device (e.g., via a graphical user interface display) for reference by the user. The tuning component 210 can also automatically set the values of tuning parameters k, $\omega_c$, $R_{oc}$, and $\omega_f$ in the motion controller (e.g., ADRC controller 808) for runtime operation in some embodiments. In such scenarios, the recommended tuning parameters 310 can be exported directly to a motion controller to facilitate tuning the motion control system in accordance with the user-defined application performance specifications. FIG. 13 is a block diagram illustrating the export of the tuning parameter values generated by control design system 202 to a motion controller 1302. In this example, a tuning application 1304 is used to tune controller gains for controller 1302, where the controller 1302 controls operation of a motor-driven motion system (not shown). The controller 1302 may be a hardware controller, such as a programmable logic controller, motor drive, or other type of hardware controller. The controller 1302 may also be a system-on-chip or other type of silicon-based or microchip controller in some implementations.

Using the techniques described above, control design system 202 can determine a suitable controller bandwidth value $\omega_{opt}$ (e.g., an optimal controller bandwidth) for controller 1302 that satisfies a set of application performance specifications specified by the user (as performance specification data 302), and generate a suitable set of tuning parameters based on the value of this determined optimal bandwidth.

The control design system 202 can then export the recommended tuning parameters 310 to the tuning application 1304. Alternatively, the design system 202 can render the recommended tuning parameter values on a user interface (e.g. generated by interface component 212), allowing a user to manually enter the controller bandwidth value into the controller 1302 via the tuning application 1304. Tuning application 1304 can then set one or more controller gains 1306 based on the provided tuning parameters. In some embodiments, controller 1302 may support ADRC, whereby only a single tuning parameter (e.g., the recommended optimal controller bandwidth) needs to be optimized to facilitate tuning the controller, thereby simplifying the process of tuning of the control loop.

In some embodiments, the specification-oriented optimization processes described above can be implemented in real-time motion control applications. In such embodiments, the components of design system 202 may be implemented on a motion controller (e.g., a programmable logic controller, a motor drive, a system-on-chip or other type of silicon-based or microchip controller, etc.) in order to determine and/or update a suitable bandwidth during runtime with respect to online-measured system parameters such as the system gain, system pole, and noise level in output. In such scenarios, the design system 202 can identify system parameters for the motion system using any suitable online identification routine, as well as updated application specifications provided by the user. The design system 202 can then generate the operational bandwidth range and determine the optimal bandwidth within this range.

At defined intervals, the integrated design system 202 can re-execute the optimization procedure described above using the updated system data, and update the tuning parameters accordingly. In this way, if the dynamics of the motion system change over time (e.g., due to wear on mechanical components), the design system 202 can dynamically modify the tuning parameters to ensure that the previously defined performance specifications remain satisfied. Since the design system 202 does not require an optimization algorithm or optimal solver to be executed (by virtue of the mapping functions 402 and 404, which can be pre-generated by the mapping component 206 and stored locally on the controller and referenced by the design system), the design system can be suitably implemented as part of an embedded system.

The motion control design system described herein can simplify the process of tuning a motion control system for operation that achieves desired performance requirements. Since the design system accepts the desired performance specifications as inputs and selects suitable tuning parameters based on these user-defined specifications, there is no need for the user to test multiple experimental tunings in a trial-and-error fashion until the desired performance is achieved. Also, prior to the optimization process, the design system determines the relationships between application specifications and the major tuning parameter, as well as the relationships between the major tuning parameter and other controller parameters, and stores these relationships as matrices and/or mapping functions. This eliminates the need to execute an optimal solver, making the design system suitable for execution on embedded control systems. The design system yields a set of tuning parameters that reliably satisfy the performance specifications, in part by taking into consideration the inner loop limits and any resonances present in the motion system.

Figure 14:
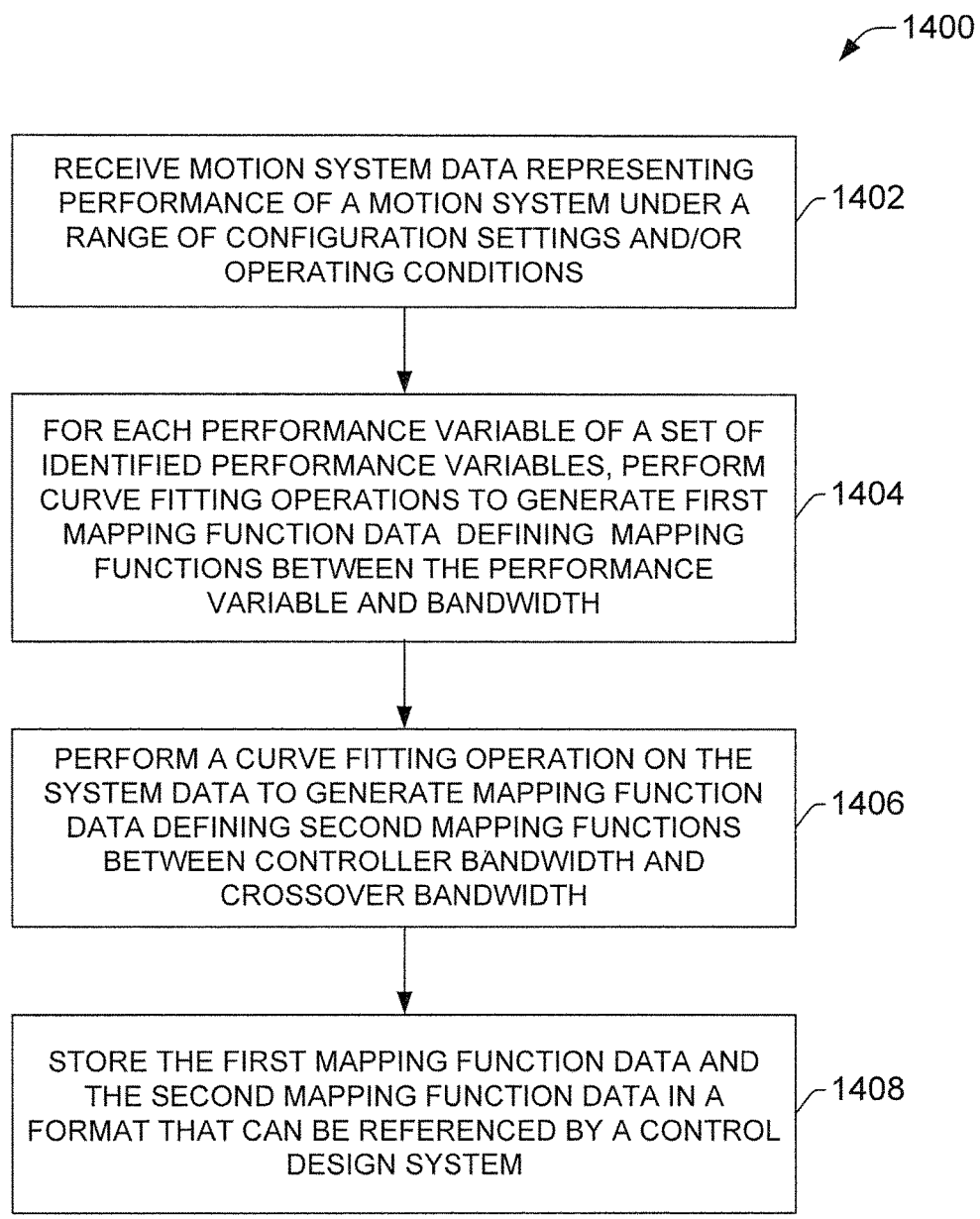
FIG. 14 is a flowchart of an example methodology for generating and storing mapping function data that can be used in connection with a specification-driven control design system.

FIGS. 14-15 illustrate methodologies in accordance with certain disclosed aspects. While, for purposes of simplicity of explanation, the methodologies are shown and described as a series of acts, it is to be understood and appreciated that the disclosed aspects are not limited by the order of acts, as some acts may occur in different orders and/or concurrently with other acts from that shown and described herein. For example, those skilled in the art will understand and appreciate that a methodology can alternatively be represented as a series of interrelated states or events, such as in a state diagram. Moreover, not all illustrated acts may be required to implement a methodology in accordance with certain disclosed aspects. Additionally, it is to be further appreciated that the methodologies disclosed hereinafter and throughout this disclosure are capable of being stored on an article of manufacture to facilitate transporting and transferring such methodologies to computers.

FIG. 14 illustrates an example methodology 1400 for generating and storing mapping function data that can be used in connection with a specification-driven control design system. Initially, at 1402, motion system data representing performance of a motion system under a range of configuration settings and/or operating conditions is received. The system data can be obtained via one or more of analytical analysis of a motion system to be tuned, simulation of the motion system, or measurement data collected from the actual motion system. The system data may represent, for example, values of one or more performance variables of the motion system under a range of different values of independent variables, such as a major tuning parameter (e.g., controller bandwidth in the case of ADRC systems), other tuning parameters, plant parameters, or other variables that have an effect on the values of the performance variables. In the present example, an ADRC control system is assumed. However, the general methodology set forth herein is also suitable for other types of motion control systems.

At 1404, for each performance variable of a set of performance variables, curve fitting operations are performed on the system data received at step 1402 to generate first mapping function data defining mapping functions between the performance variable and bandwidth. The bandwidth in this step can be either the controller bandwidth $\omega_c$ or the crossover bandwidth $\omega_x$. Example mapping functions for three different performance variables are given by equations (7)-(12) above. For each performance variable, the mapping function from the performance variable to the bandwidth, as well as its inverse function that maps from the bandwidth to the performance variable, are obtained separately.

At 1406, a curve fitting operation performed on the system data received at step 1402 in order to generate second mapping function data defining mapping functions between controller bandwidth $\omega_c$ and crossover bandwidth $\omega_x$ of the motion system. These mapping functions can have a form given by equations (5) and (6) above. In one or more embodiments, a multiple independent variable curve fitting method can be applied to the system data received at step 1402 in order to obtain the mapping functions.

At 1408, the first mapping function data obtained at step 1404 and the second mapping function data obtained at step 1406 are stored in a format that can be referenced by a control design system. For example, the first mapping function data can be stored as matrix data or another suitable data format that allows a value of the bandwidth to be determined given the parameter function value, system parameters, and ratio $R_{oc}$, and that allows a value of the performance variable to be obtained given the bandwidth value, the system parameters, and ratio $R_{oc}$. Likewise, the second mapping function data can be stored as matrix data, or another suitable data format that allows a value of the controller bandwidth $\omega_c$ to be determined given the system pole p, ratio $R_{oc}$, and crossover bandwidth $\omega_x$ (in the case of the mapping from crossover bandwidth to controller bandwidth), and a value of the crossover bandwidth $\omega_c$ to be determined given the system pole p, ratio $R_{oc}$, and controller bandwidth $\omega_c$ (in the case of the mapping from controller bandwidth to crossover bandwidth).

Figure 15A:
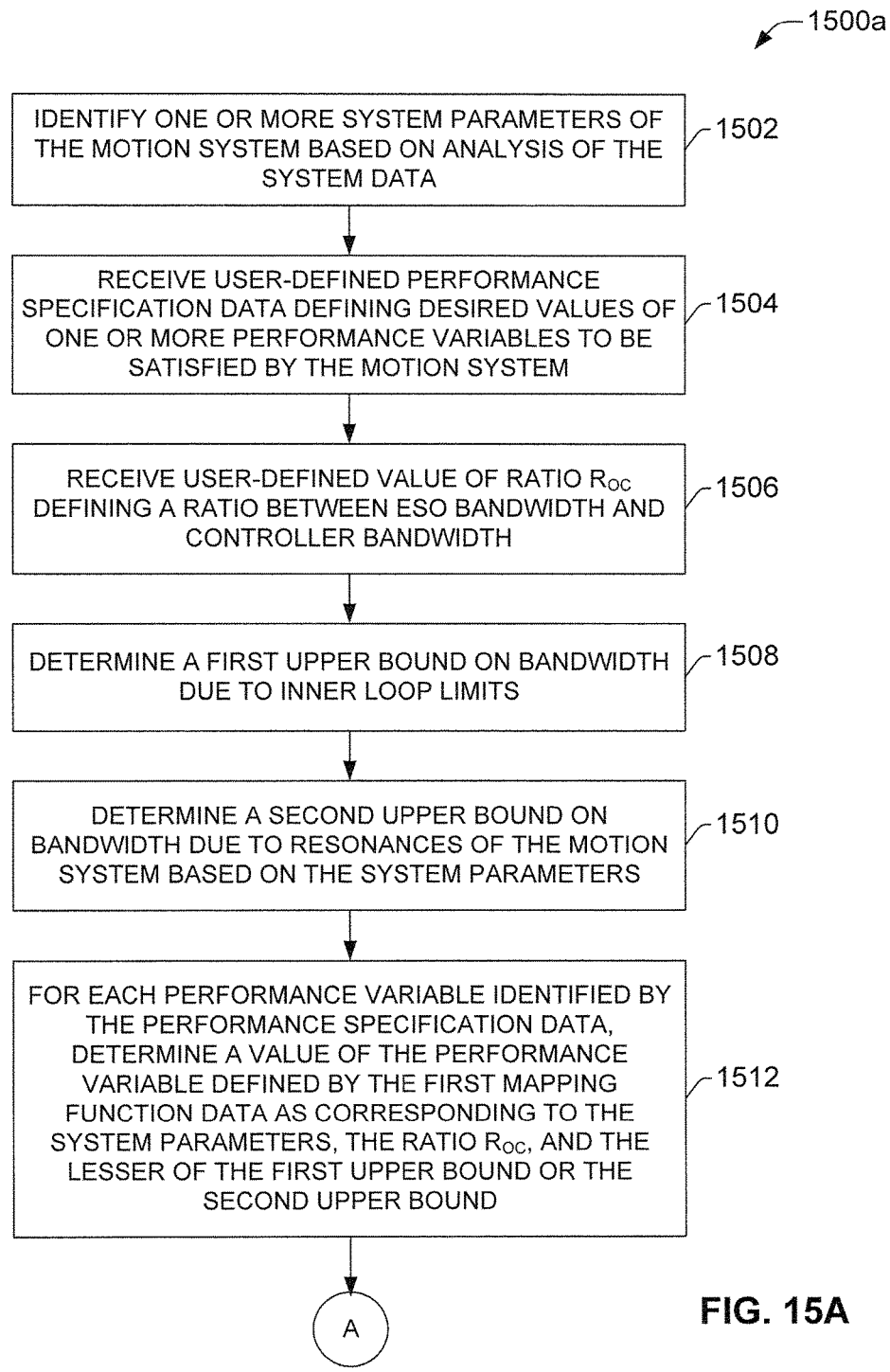
FIGS. 15A-15C are flowcharts of an example methodology for generating suitable tuning parameters for a motion control system based on user-defined performance specifications.

FIG. 15A illustrates a first part of an example methodology 1500a for generating and setting suitable tuning parameters for a motion control system based on user-defined performance specifications. The methodology can be implemented by a control design system that allows a user to enter preferred performance specifications for a motion system, and generates suitable tuning parameters designed to yield system performance that satisfies the user-defined specifications. Initially, at 1402, one or more system parameters of a motion system are identified based on a suitable identification algorithm. The identified parameters can include, for example, the system gain k of the motion system, the system pole p, resonance frequency information for the motion system (frequency, peak, and width), output noise level, or other such system parameters. Any suitable identification algorithms or vibration detection algorithms can be applied to the system data to determine the system parameters.

At 1504, user-defined performance specification data is received, where the performance specification data identifies motion system performance requirements defined by the user. In particular, the performance specification data defines desired values of one or more performance variables that are to be satisfied by the motion system. The performance variables may include, but are not limited to, one or more of a maximum disturbance deviation of the motion system from a reference speed or position, maximum disturbance settling time, control signal noise level, system variable variation tolerance range, torque or speed noise ratio, gain margin, phase margin, inertia variation range, open-loop cross-over frequency, or other such performance variables. In some embodiments, the control design system can generate a user interface display that allows the user to select one or more performance variables of interest, and to set desired values for each of the selected performance variables according to the requirements of the particular motion control application being carried out by the motion system under design.

At 1506, a user-defined value of a ratio $R_{oc}$ is received, where $R_{oc}$ defines a ratio between extended state observer bandwidth $\omega_0$ and controller bandwidth $\omega_c$. Ratio $R_{oc}$ can be used as an optional tuning parameter to adjust the system variation tolerance range. In general, the lower the value of $R_{oc}$, the wider the variation tolerance range of the system gain parameter k.

At 1508, a first upper bound $\omega_{in}$ on the bandwidth due to inner loop limits is determined. This first upper bound is determined as a function of the inner loop time constant and discrete sample time, and can be obtained based on equation (13) above or another suitable function.

At 1510, if resonances are present in the motion system, a second upper bound $\omega_{r1}$ on the bandwidth due to the resonances is determined. This second upper bound can be determined based on the resonance frequency identified as one of the system parameters at step 1502 (e.g., using equation (14) above).

At 1512, for each performance variable identified by the performance specification data received at step 1504, a value of the performance variable corresponding to the lesser of the first upper bound wt, or the second upper bound $\omega_{r1}$ is determined. In particular, the methodology determines the value of the performance variable defined by the first mapping function data obtained at step 1404 of methodology 1400 as corresponding to the system parameters, the ratio $R_{oc}$, and the lesser of the first upper bound $\omega_{in}$ or the second upper bound $\omega_{r1}$. These values of the performance variables represent presumed best achievable values of each performance variable given the known system parameters.

Figure 15B:
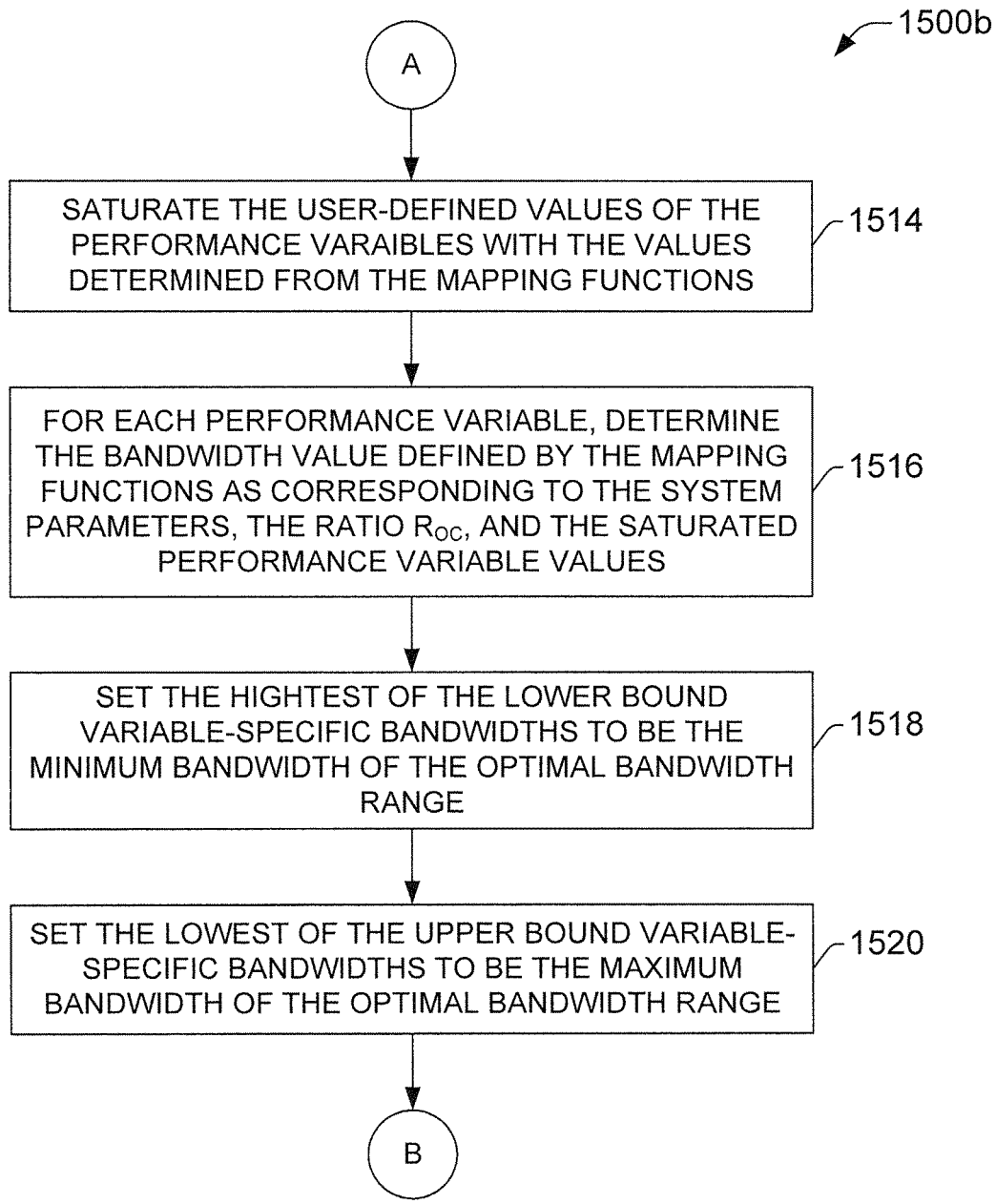

The methodology then proceeds to the second part 1500b illustrated in FIG. 15B. At 1514, the user-defined values of the performance variables defined by the performance specification data received at step 1504, which represent the user's desired performance specifications, are saturated with their corresponding best achievable values determined at step 1512. These saturated values are used as the values of the performance variables for the remaining steps.

At 1516, for each performance variable, a value of the bandwidth corresponding to the saturated values of the performance parameters is determined. In particular, for each performance variable the methodology determines the bandwidth defined by the first mapping function data obtained at step 1404 of methodology 1400 as corresponding to the system parameters, the ratio $R_{oc}$, and the saturated performance variable value. These bandwidths represent the bandwidths that optimize their corresponding performance variables.

At 1518, the highest of the lower bound variable-specific bandwidths determined at step 1516 is set to be the minimum bandwidth $\omega_{min}$ of the optimal bandwidth range. The lower bound bandwidths are those that correspond to performance variables for which lower values correlate to more desirable performance.

At 1520, the lowest of the upper bound variable-specific bandwidths determined at step 1516 is set to be the maximum bandwidth $\omega_{max}$ of the optimal bandwidth range. The upper bound bandwidths are those that correspond to performance variables for which higher values correlate to more desirable performance.

Figure 15C:
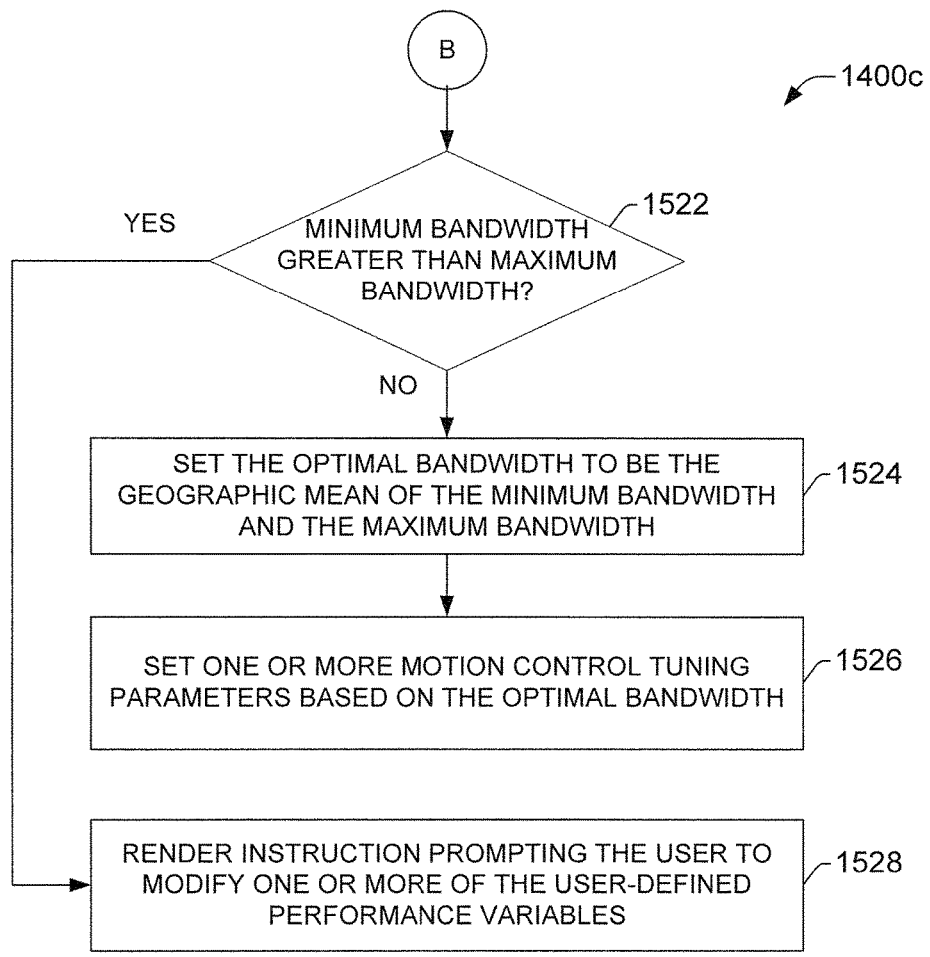

The methodology then proceeds to the third part 1500c illustrated in FIG. 15C. At 1522, a determination is made as to whether the minimum bandwidth $\omega_{min}$ determined at step 1518 is greater than the maximum bandwidth $\omega_{max}$ determined at step 1520. If the minimum bandwidth is greater than the maximum bandwidth (YES at step 1522), the methodology proceeds to step 1528, where an instruction is rendered (e.g., via a user interface display generated by interface component 212) prompting the user to modify one or more of the user-defined performance variable values defined at step 1504. In this regard, if the minimum bandwidth is found to be greater than the maximum bandwidth, it suggests that the performance specifications defined by the user cannot be satisfied by the motion system under any tuning, and therefore one or more user-defined performance variables should be relaxed.

Alternatively, if the minimum bandwidth is not greater than the maximum bandwidth (NO at step 1522), the methodology proceeds to step 1524, where the optimal bandwidth $\omega_{opt}$ is set to be the geometric mean of the minimum bandwidth $\omega_{min}$ found at step 1518 and the maximum bandwidth $\omega_{max}$ found at step 1520 (e.g., based on equation (23) above). At 1526, one or more motion control tuning parameters are set based on the optimal bandwidth found at step 1524. In the example case of ADRC motion control systems, the tuning parameters can include the controller bandwidth $\omega_c$, the system gain parameter k, the ratio $R_{oc}$ selected by the user, and the low-pass filter bandwidth $\omega_f$ (obtained based on the optimal controller bandwidth). If the optimal bandwidth $\omega_{opt}$ determined above is the crossover bandwidth $\omega_x$, the controller bandwidth $\omega_c$ can be determined using the second mapping function data obtained at step 1406 of methodology 1400. The second mapping function can conform generally to the format of equation (6) above, with $\omega_{opt}$ used as the value of $\omega_x$ in order to determine controller bandwidth $\omega_c$.

Exemplary Networked and Distributed Environments

One of ordinary skill in the art can appreciate that the various embodiments described herein can be implemented in connection with any computer or other client or server device, which can be deployed as part of a computer network or in a distributed computing environment, and can be connected to any kind of data store where media may be found. In this regard, the various embodiments of the control design system described herein can be implemented in any computer system or environment having any number of memory or storage units (e.g., memory 216 of FIG. 2), and any number of applications and processes occurring across any number of storage units. This includes, but is not limited to, an environment with server computers and client computers deployed in a network environment or a distributed computing environment, having remote or local storage. For example, with reference to FIG. 2, the system identification component 204, mapping component 206, optimization component 208, tuning component 210, and interface component 212 can be stored on a single memory 216 associated with a single device, or can be distributed among multiple memories associated with respective multiple devices. Similarly, system identification component 204, mapping component 206, optimization component 208, tuning component 210, and interface component 212 can be executed by a single processor 214, or by multiple distributed processors associated with multiple devices.

Distributed computing provides sharing of computer resources and services by communicative exchange among computing devices and systems. These resources and services include the exchange of information, cache storage and disk storage for objects. These resources and services can also include the sharing of processing power across multiple processing units for load balancing, expansion of resources, specialization of processing, and the like. Distributed computing takes advantage of network connectivity, allowing clients to leverage their collective power to benefit the entire enterprise. In this regard, a variety of devices may have applications, objects or resources that may participate in the various embodiments of this disclosure.

Figure 16:
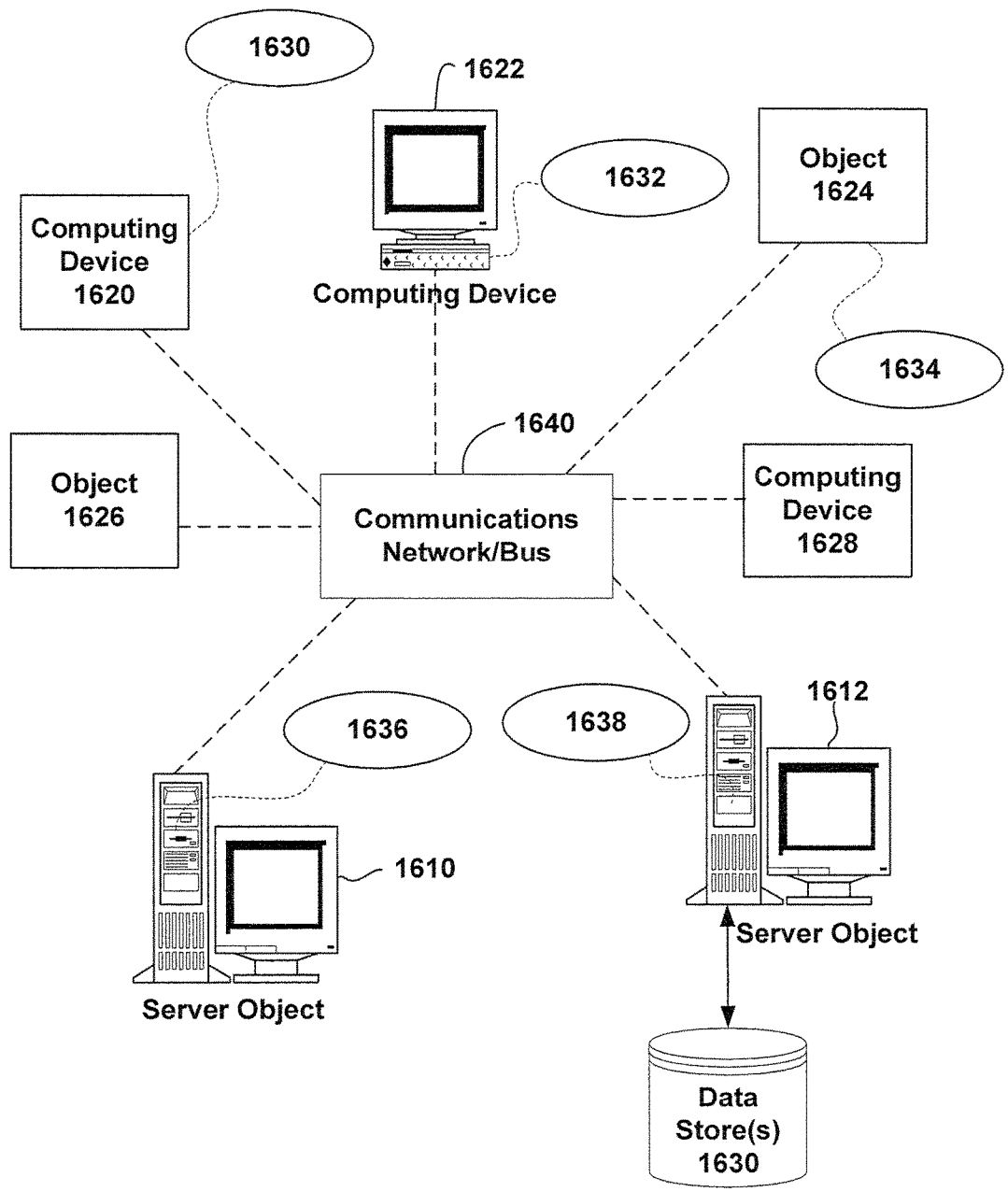
FIG. 16 is a block diagram representing an exemplary networked or distributed computing environment for implementing one or more embodiments described herein.

FIG. 16 provides a schematic diagram of an exemplary networked or distributed computing environment. The distributed computing environment includes computing objects 1610, 1612, etc. and computing objects or devices 1620, 1622, 1624, 1626, 1628, etc., which may include programs, methods, data stores, programmable logic, etc., as represented by applications 1630, 1632, 1634, 1636, 1638. It can be appreciated that computing objects 1610, 1612, etc. and computing objects or devices 1620, 1622, 1624, 1626, 1628, etc. may comprise different devices, such as personal digital assistants (PDAs), audio/video devices, mobile phones, MP3 players, personal computers, laptops, tablets, etc., where embodiments of the design system described herein may reside on or interact with such devices.

Each computing object 1610, 1612, etc. and computing objects or devices 1620, 1622, 1624, 1626, 1628, etc. can communicate with one or more other computing objects 1610, 1612, etc. and computing objects or devices 1620, 1622, 1624, 1626, 1628, etc. by way of the communications network 1640, either directly or indirectly. Even though illustrated as a single element in FIG. 16, communications network 1640 may comprise other computing objects and computing devices that provide services to the system of FIG. 16, and/or may represent multiple interconnected networks, which are not shown. Each computing object 1610, 1612, etc. or computing objects or devices 1620, 1622, 1624, 1626, 1628, etc. can also contain an application, such as applications 1630, 1632, 1634, 1636, 1638 (e.g., control design system 202 or components thereof), that might make use of an API, or other object, software, firmware and/or hardware, suitable for communication with or implementation of various embodiments of this disclosure.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any suitable network infrastructure can be used for exemplary communications made incident to the systems as described in various embodiments herein.

Thus, a host of network topologies and network infrastructures, such as client/server, peer-to-peer, or hybrid architectures, can be utilized. The "client" is a member of a class or group that uses the services of another class or group. A client can be a computer process, e.g., roughly a set of instructions or tasks, that requests a service provided by another program or process. A client process may utilize the requested service without having to "know" all working details about the other program or the service itself.

In a client/server architecture, particularly a networked system, a client can be a computer that accesses shared network resources provided by another computer, e.g., a server. In the illustration of FIG. 16, as a non-limiting example, computing objects or devices 1620, 1622, 1624, 1626, 1628, etc. can be thought of as clients and computing objects 1610, 1612, etc. can be thought of as servers where computing objects 1610, 1612, etc. provide data services, such as receiving data from client computing objects or devices 1620, 1622, 1624, 1626, 1628, etc., storing of data, processing of data, transmitting data to client computing objects or devices 1620, 1622, 1624, 1626, 1628, etc., although any computer can be considered a client, a server, or both, depending on the circumstances. Any of these computing devices may be processing data, or requesting transaction services or tasks that may implicate the techniques for systems as described herein for one or more embodiments.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to the techniques described herein can be provided standalone, or distributed across multiple computing devices or objects.

In a network environment in which the communications network/bus 1640 is the Internet, for example, the computing objects 1610, 1612, etc. can be Web servers, file servers, media servers, etc. with which the client computing objects or devices 1620, 1622, 1624, 1626, 1628, etc. communicate via any of a number of known protocols, such as the hypertext transfer protocol (HTTP). Computing objects 1610, 1612, etc. may also serve as client computing objects or devices 1620, 1622, 1624, 1626, 1628, etc., as may be characteristic of a distributed computing environment.

Exemplary Computing Device

Figure 17:
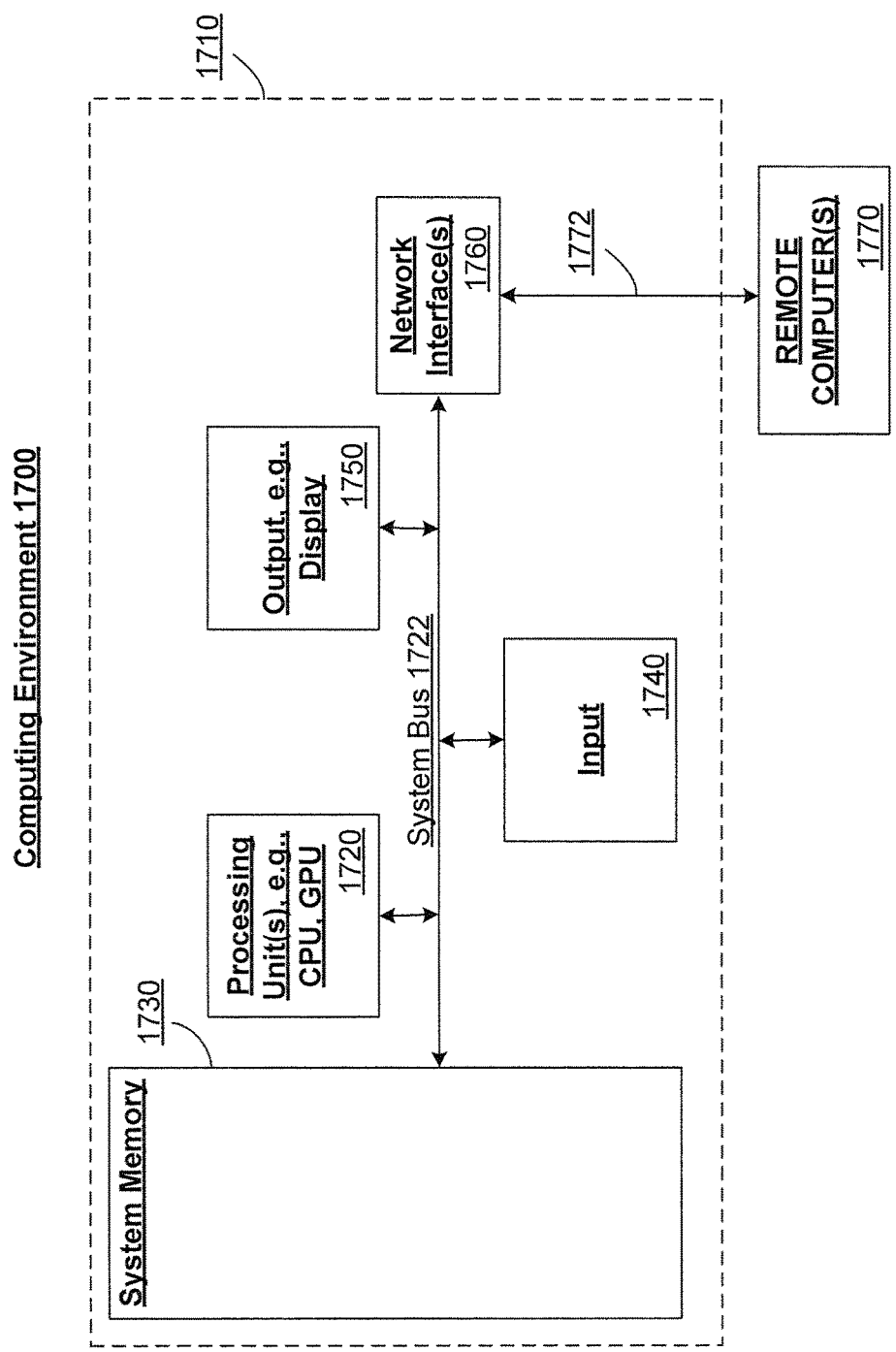
FIG. 17 is a block diagram representing an exemplary computing system or operating environment for implementing one or more embodiments described herein.

As mentioned, advantageously, the techniques described herein can be applied to any suitable device. It is to be understood, therefore, that handheld, portable and other computing devices and computing objects of all kinds are contemplated for use in connection with the various embodiments. Accordingly, the below computer described below in FIG. 17 is but one example of a computing device. Additionally, a suitable server can include one or more aspects of the below computer, such as a media server or other media management server components.

Although not required, embodiments can partly be implemented via an operating system, for use by a developer of services for a device or object, and/or included within application software that operates to perform one or more functional aspects of the various embodiments described herein. Software may be described in the general context of computer executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is to be considered limiting.

FIG. 17 thus illustrates an example of a suitable computing system environment 1700 in which one or aspects of the embodiments described herein can be implemented, although as made clear above, the computing system environment 1700 is only one example of a suitable computing environment and is not intended to suggest any limitation as to scope of use or functionality. Neither is the computing system environment 1700 be interpreted as having any dependency or requirement relating to any one or combination of components illustrated in the exemplary computing system environment 1700.

With reference to FIG. 17, an exemplary computing device for implementing one or more embodiments in the form of a computer 1710 is depicted. Components of computer 1710 may include, but are not limited to, a processing unit 1720, a system memory 1730, and a system bus 1722 that couples various system components including the system memory to the processing unit 1720. Processing unit 1720 may, for example, perform functions associated with processor(s) 214 of control design system 202, while system memory 1730 may perform functions associated with memory 216.

Computer 1710 typically includes a variety of computer readable media and can be any available media that can be accessed by computer 1710. The system memory 1730 may include computer storage media in the form of volatile and/or nonvolatile memory such as read only memory (ROM) and/or random access memory (RAM). By way of example, and not limitation, system memory 1730 may also include an operating system, application programs, other program modules, and program data.

A user can enter commands and information into the computer 1710 through input devices 1740, non-limiting examples of which can include a keyboard, keypad, a pointing device, a mouse, stylus, touchpad, touchscreen, trackball, motion detector, camera, microphone, joystick, game pad, scanner, or any other device that allows the user to interact with computer 1710. A monitor or other type of display device is also connected to the system bus 1722 via an interface, such as output interface 1750. In addition to a monitor, computers can also include other peripheral output devices such as speakers and a printer, which may be connected through output interface 1750. In one or more embodiments, input devices 1740 can provide user input to interface component 212, while output interface 1750 can receive information relating to operations of the control design system 202 from interface component 212.

The computer 1710 may operate in a networked or distributed environment using logical connections to one or more other remote computers, such as remote computer 1770. The remote computer 1770 may be a personal computer, a server, a router, a network PC, a peer device or other common network node, or any other remote media consumption or transmission device, and may include any or all of the elements described above relative to the computer 1710. The logical connections depicted in FIG. 16 include a network 1772, such local area network (LAN) or a wide area network (WAN), but may also include other networks/buses e.g., cellular networks.

As mentioned above, while exemplary embodiments have been described in connection with various computing devices and network architectures, the underlying concepts may be applied to any network system and any computing device or system in which it is desirable to publish or consume media in a flexible way.

Also, there are multiple ways to implement the same or similar functionality, e.g., an appropriate API, tool kit, driver code, operating system, control, standalone or downloadable software object, etc. which enables applications and services to take advantage of the techniques described herein. Thus, embodiments herein are contemplated from the standpoint of an API (or other software object), as well as from a software or hardware object that implements one or more aspects described herein. Thus, various embodiments described herein can have aspects that are wholly in hardware, partly in hardware and partly in software, as well as in software.

The word "exemplary" is used herein to mean serving as an example, instance, or illustration. For the avoidance of doubt, the aspects disclosed herein are not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, for the avoidance of doubt, such terms are intended to be inclusive in a manner similar to the term "comprising" as an open transition word without precluding any additional or other elements.

Computing devices typically include a variety of media, which can include computer-readable storage media (e.g., memory 216) and/or communications media, in which these two terms are used herein differently from one another as follows. Computer-readable storage media can be any available storage media that can be accessed by the computer, is typically of a non-transitory nature, and can include both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

As mentioned, the various techniques described herein may be implemented in connection with hardware or software or, where appropriate, with a combination of both. As used herein, the terms "component," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers. Further, a "device" can come in the form of specially designed hardware; generalized hardware made specialized by the execution of software thereon that enables the hardware to perform specific function (e.g., coding and/or decoding); software stored on a computer readable medium; or a combination thereof.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it is to be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In order to provide for or aid in the inferences described herein (e.g. in connection with curve fitting operations), components described herein can examine the entirety or a subset of the data to which it is granted access and can provide for reasoning about or infer states of the system, environment, etc. from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data.

Such inference can result in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines, etc.) can be employed in connection with performing automatic and/or inferred action in connection with the claimed subject matter.

In view of the exemplary systems described above, methodologies that may be implemented in accordance with the described subject matter will be better appreciated with reference to the flowcharts of the various figures (e.g., FIGS. 14-15). While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, not all illustrated blocks may be required to implement the methodologies described hereinafter.

In addition to the various embodiments described herein, it is to be understood that other similar embodiments can be used or modifications and additions can be made to the described embodiment(s) for performing the same or equivalent function of the corresponding embodiment(s) without deviating there from. Still further, multiple processing chips or multiple devices can share the performance of one or more functions described herein, and similarly, storage can be effected across a plurality of devices. Accordingly, the invention is not to be limited to any single embodiment, but rather can be construed in breadth, spirit and scope in accordance with the appended claims.

What is claimed is:
1. A system, comprising:
a memory;
a processor configured to control a motion system and to execute components stored on the memory, the components comprising:

a mapping component configured to, for each performance variable of one or more performance variables, generate mapping function data based on a curve fitting operation performed on system data relating to a control system;

a system identification component configured to identify one or more system parameters of the control system;

an optimization component configured to
receive performance specification data defining values of the one or more performance variables to be satisfied by the control system, determine, based on the mapping function data and the one or more system parameters, best achievable values of the one or more performance variables and respective controller bandwidths corresponding to the best achievable values, and generate, as a recommended bandwidth value for the control system, a geometric mean of a highest bandwidth of one or more lower bound bandwidths of the respective controller bandwidths and a lowest bandwidth of one or more upper bound bandwidths of the respective controller bandwidths; and a tuning component configured to set one or more tuning parameters of the control system based on the recommended bandwidth value.

2. The system of claim 1, wherein the recommended bandwidth value is one of a recommended crossover bandwidth value or a recommended controller bandwidth value.

3. The system of claim 1, wherein the mapping function data defines a first mapping from a controller bandwidth of the control system to a crossover bandwidth of the control system, and a second mapping from the crossover bandwidth to the controller bandwidth.

4. The system of claim 1, wherein the mapping function data defines, for each performance variable of the one or more performance variables, a first mapping from the performance variable to a controller bandwidth of the control system and a second mapping from the controller bandwidth to the performance variable.

5. The system of claim 4, wherein the first mapping and the second mapping are functions of the one or more system parameters and a secondary tuning parameter.

6. The system of claim 1, wherein the optimization component is configured to saturate the values of the one or more performance variables using the best achievable values of the one or more performance variables to yield saturated values, and to determine the respective controller bandwidths based on that saturated values.

7. The system of claim 1, wherein the one or more performance variables comprise at least one of a maximum disturbance deviation of the control system, a settling time of the control system, a control signal noise level of the control system, a system variable variation tolerance range of the control system, a gain margin of the control system, a phase margin of the control system, an inertia variation range of the control system, or an open-loop cross-over frequency of the control system.

8. The system of claim 1, wherein the one or more system parameters comprise at least one of a system gain parameter of the control system, a system pole of the control system, a maximum noise variation of an output signal of the control system, or a resonance frequency of the control system.

9. The system of claim 8, wherein the one or more tuning parameters comprise at least one of the system gain parameter of the control system, a controller bandwidth, a ratio between the controller bandwidth an extended state observer bandwidth, a low-pass filter bandwidth, or a resonance frequency.

10. A method, comprising:
for each performance variable of one or more performance variables, generating, by a system comprising a processor, mapping function data based on a curve fitting operation performed on system data relating to a control system;

identifying, by the system, one or more system parameters of the control system based on analysis of the system data relating to the control system;

receiving, by the system, performance specification data defining values of one or more performance variables to be satisfied by the control system;

determining, by the system based on the mapping function data and the one or more system parameters, best achievable values of the one or more performance variables and respective controller bandwidths corresponding to the best achievable values;

generating, by the system as a recommended bandwidth value for the control system, a geometric mean of a highest bandwidth of one or more lower bound bandwidths of the respective controller bandwidths and a lowest bandwidth of one or more upper bound bandwidths of the respective controller bandwidths;

setting, by the system, one or more tuning parameters of the control system based on the recommended bandwidth value; and controlling a motion system using the control system based on the one or more tuning parameters.

11. The method of claim 10, wherein the generating the recommended bandwidth comprises generating, as the recommended bandwidth value, a recommended crossover bandwidth value or a recommended controller bandwidth value.

12. The method of claim 10,
wherein the generating the mapping function data comprises generating the mapping function data to define a first mapping from a controller bandwidth of the control system to a crossover bandwidth of the control system, and a second mapping from the crossover bandwidth to the controller bandwidth.

13. The method of claim 10,
wherein the generating the mapping function data comprises generating the mapping function data to define a first mapping from the performance variable to a controller bandwidth of the control system and a second mapping from the controller bandwidth to the performance variable.

14. A motion control system, comprising:
a motor that drives a mechanical load;
a controller configured to generate a reference signal that causes the motor to apply a torque to the mechanical load; and
a design system configured to:
for each performance variable of one or more performance variables, generate mapping function data based on a curve fitting operation performed on system data relating to the motion control system,
identify one or more system parameters of the motion control system based on analysis of the system data,
receive performance specification data defining values of one or more performance variables to be satisfied by the motion control system,
determine, based on the mapping function data and the one or more system parameters, best achievable values of the one or more performance variables and respective controller bandwidths corresponding to the best achievable values, generate, as a recommended bandwidth value for the motion control system, a geometric mean of a highest bandwidth of one or more lower bound bandwidths of the respective controller bandwidths and a lowest bandwidth of one or more upper bound bandwidths of the respective controller bandwidths, and set one or more tuning parameters of the motion control system based on the recommended bandwidth.

15. The motion control system of claim 14, wherein the motor is at least one of a traction motor of an electric vehicle; a motor that drives a portion of an industrial robot; a conveyor motor; a motor that drives a washing machine; a motor that drives a component of a heating, ventilating, and air conditioning (HVAC) system; or a motor that drives a portion of an industrial automation system.

16. The motion control system of claim 14, wherein the one or more performance variables comprise at least one of a maximum disturbance deviation of the motion control system, a settling time of the motion control system, a control signal noise level of the motion control system, a system variable variation tolerance range of the motion control system, a gain margin of the motion control system, a phase margin of the motion control system, an inertia variation range of the motion control system, or an open-loop cross-over frequency of the motion control system.

17. The motion control system of claim 14, wherein the one or more tuning parameters comprise at least one of the system gain parameter of the motion control system, a controller bandwidth, a ratio between the controller bandwidth an extended state observer bandwidth, a low-pass filter bandwidth, or a resonance frequency.

18. The motion control system of claim 14, wherein the generating the mapping function data comprises generating the mapping function data to define a first mapping from the performance variable to a controller bandwidth of the motion control system and a second mapping from the controller bandwidth to the performance variable.

19. The system of claim 1, wherein the motor is at least one of a traction motor of an electric vehicle; a motor that drives a portion of an industrial robot; a conveyor motor; a motor that drives a washing machine; a motor that drives a component of a heating, ventilating, and air conditioning (HVAC) system; or a motor that drives a portion of an industrial automation system.

20. The method of claim 10, wherein the controlling the motion system comprises controlling at least one of a traction motor of an electric vehicle; a motor that drives a portion of an industrial robot; a conveyor motor; a motor that drives a washing machine; a motor that drives a component of a heating, ventilating, and air conditioning (HVAC) system; or a motor that drives a portion of an industrial automation system.

* * * * *